United States Patent [19]

Wambergue

[11] Patent Number: 4,949,294

[45] Date of Patent: Aug. 14, 1990

[54] COMPUTATION CIRCUIT USING RESIDUAL ARITHMETIC

[75] Inventor: Claude Wambergue, Sceaux, France

[73] Assignee: Thomson-CSF, Paris, France

[21] Appl. No.: 264,244

[22] Filed: Oct. 28, 1988

[30] Foreign Application Priority Data

Oct. 30, 1987 [FR] France .................... 87 15057

[51] Int. Cl.$^5$ .................................. G06F 7/38
[52] U.S. Cl. .................................. 364/746
[58] Field of Search .................... 364/746, 754, 746.1

[56] References Cited

U.S. PATENT DOCUMENTS

| | | | |
|---|---|---|---|
| 4,281,391 | 7/1981 | Huang | 364/746 |
| 4,506,340 | 3/1985 | Circello et al. | 364/746 |
| 4,532,638 | 7/1985 | Lagger et al. | 364/746 X |

FOREIGN PATENT DOCUMENTS 1235676 6/1971 United Kingdom .

OTHER PUBLICATIONS

1986 IEEE International Symposium on Circuits and Systems, San Jose, CA, May 5–7, 1986, vol. 1 of 3, pp. 117–120, IEEE, New York; M. A. Bayoumi, "Wafer Scale Integration for Generic RNS Structures".
Nineteenth Asilomar Conference on Circuits, Systems & Computers, Nov. 6–8, 1985, Pacific Grove, CA, pp. 48–52, IEEE Computer Society Press, New York; M. A. Bayoumi, "Implementation of RNS Multiplication in VLSI".

Primary Examiner—Gary V. Harkcom
Assistant Examiner—Tan V. Mai
Attorney, Agent, or Firm—Pollock, VandeSande & Priddy

[57] ABSTRACT

A computing circuit using residual arithmetic, particularly on complex numbers. The computation circuit uses residual notation. In residual notation, the computations can be done independently on each digit. It is therefore advantageous to perform the computations simultaneously on all the digits. Advantageously, the arithmetic is built on a unitary commutative ring for which the number 1 is not a quadratic residue. In this case, it is possible to perform a complex multiplication by adding two indices. The embodiment of the invention takes the form of a computer, electronic card or integrated circuit.

7 Claims, 11 Drawing Sheets

COMPUTATION CIRCUIT USING RESIDUAL ARITHMETIC

BACKGROUND OF THE INVENTION

1. Field of the Invention

The invention is chiefly a computation circuit or computer using a residual arithmetic, especially on complex numbers.

2. Description of the Prior Art

There are known methods for making computation circuits using positional notation bases. In a base of this type, any whole number is factorized in a single way on the base elements which are generally the successive powers of a whole number. Any whole number A may be written in a base b in the form:

$$A = a_n b^n + a_{n-1} b^{n-1} + \ldots a_i b^i + \ldots + a_3 b^3 + a_2 b^2 + a_1 b + a_0.$$

There is a one-to-one correspondence between the numbers and the sets of coefficients $a_i$ of their factorization in a given base.

For technological reasons, computation circuits using semiconductor components use mainly the base 2.

Residual arithmetic is known and has been described, in particular, in H. L. Garner, "The Residue Number System", IRE Trans. Elect. Comp., June 1959.

The device according to the present invention uses residual arithmetic to perform computations. In the device according to the invention, the residual arithmetic is adapted and optimized to perform computations and, especially, complex multiplications. Through the choices made in building the most efficient device according to the invention, a complex multiplication amounts to the addition of two whole numbers.

To perform the desired computations, the device according to the present invention converts the data of the positional base into a residual base, performs the operations and reconverts the results into the desired positional notation.

Furthermore, the residual notation enables the performance of computations independently on each digit without any spread of carried-over values. Thus, the device according to the present invention performs computations simultaneously on all the digits.

SUMMARY OF THE INVENTION

A main object of the invention is a computation device comprising an encoding module capable of encoding numbers in residual notation, a computation module capable of performing computations in residual notation, and a decoding module capable of transcoding numbers from the residual notation into a desired notation.

Another object of the invention is a computing device wherein, in the notation used, the residues are computed modulo the numbers $m_i$ of the form $m_i = 4k + 3$ where k is a whole number.

Another object of the invention is a device wherein the computation module has means used to associate, with each complex number, an index such that a multiplication of two complex numbers corresponds bi-uniquely to an addition of said indices.

Another object of the invention is a computing device comprising a control module capable of modifying the exchanges of external and internal data of said computing device as well as the computations performed by the computing module.

Another object of the invention is a computing device with a control module having a bus capable of giving it the instructions needed for the desired sequencing of the computations.

Another object of the invention is a computing device comprising buses capable of connecting the computing module to internal or external memories capable of containing numbers written in residual notation.

Another object of the invention is a computing device wherein the computing module is connected by a bus to a read-only memory.

Another object of the invention is a computing device wherein said device is capable of performing convolutions.

Another object of the invention is a computing device comprising read-only memories in which tabulated functions are stored.

Another object of the invention is a device capable of performing correlations.

Another object of the invention is a device comprising read-only memories in which tabulated functions are stored.

Another object of the invention is a device wherein the encoding and/or decoding modules comprise data paths used to perform the addition of the carried-over value at the end of the computation on each digit of the transcoding operation.

Another object of the invention is a device made in the form of an electronic card.

Another object of the invention is a computing device made in the form of an integrated circuit.

BRIEF DESCRIPTION OF THE DRAWINGS

The invention will be better understood from the following description and the figures, appended as non-restrictive examples, of which:

In FIGS. 1 to 11, the same references are used to designate the same elements.

DESCRIPTION OF PREFERRED EMBODIMENTS

Figure 6:
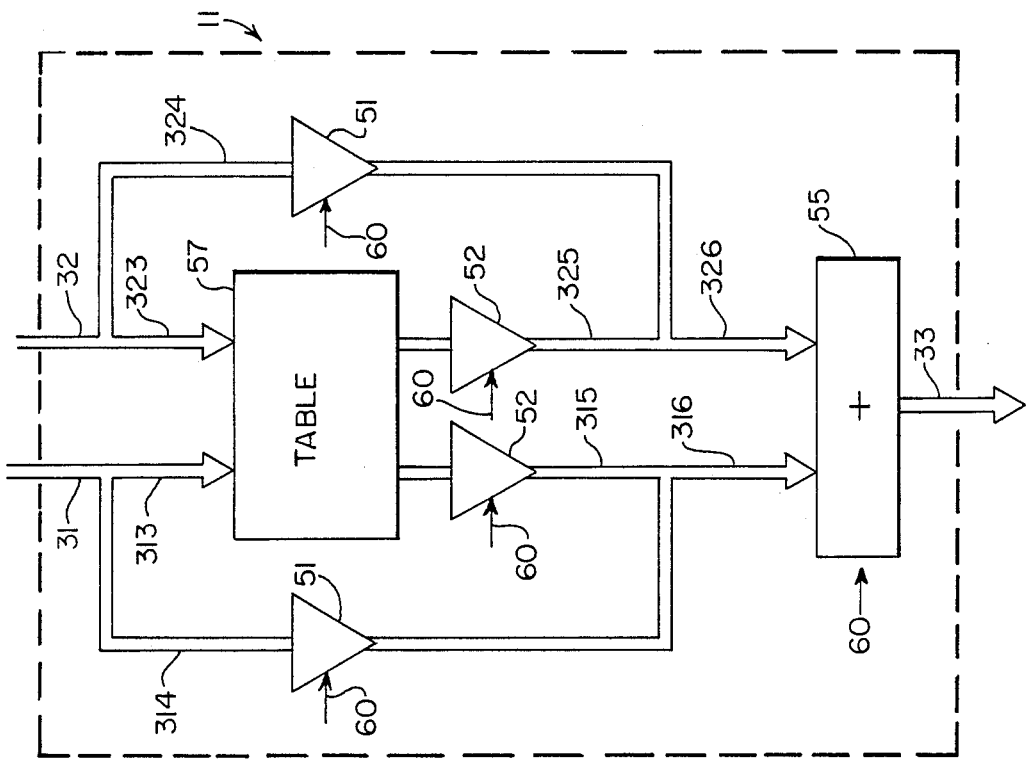
FIG. 6 is a diagram of a detail of the embodiment of the device shown in FIG. 5.

We shall now recall notations and definitions commonly used in mathematics.

It is taken that Z, the set of rational whole numbers, is an ordered set.

Let us define the division of whole numbers known as Euclidian division.

Let a and b be two whole numbers where b is a positive whole number. The division of a by b is defined by:

$$a = b \cdot q + r, \quad 0 \leq r < b$$

where q is the quotient and r is the remainder.

When r is null, b and q are factors or divisors of a, and b is said to divide a. When there are no other divisors other than 1 and a, a is a prime number. In all other cases, a is a composite number.

The greatest positive whole number d which divides two whole numbers a and b is called the PGCD of a and b, marked d=(a, b).

The fundamental theorem of arithmetic stipulates that any number can be factorized into a product of powers of whole numbers.

$$a = \pi p_i^{c_i}$$

where $c_i$ is a whole number, and that this factorization is unique.

When two numbers a and b have no common factors other than 1, they are said to be relatively prime numbers:

$$d = (a, b) = 1.$$

Let us define congruence and residues.

The division of a whole number a by a whole number b produces a remainder r.

All whole numbers which give the same remainder when they are divided by b may be considered to belong to the same class of equivalence for the equivalence relation:

$$a = bq + r$$

Two whole numbers, $a_1$ and $a_2$, belonging to the same class are said to be congruent modulo b and the equivalence is written:

$$a_1 \equiv a_2 \text{ modulo b (or mod b)}$$

In fact, we are concerned only with the remainder r of the division of a by b, and this remainder is called the residue of a modulo b, written r≡a modulo b.

With congruences, the division is not defined. However, it is possible to define something that approaches it by considering the congruence:

$$a.x \equiv c \mod b$$

It is shown that x exists only if d divides c where d is the PGCD of a and b.

In particular, if a and b are relatively prime numbers (d=1), the congruence:

$$a.x \equiv 1 \mod b$$

has a solution, and x is called the converse of:
a modulo b, written $a^{-1}$.

When the PGCD of a and b equals 1, a is said to be a quadratic residue of b if:

$$x^2 \equiv a \mod b$$

allows a solution. If this congruence has no solution, a is a quadratic non-residue of b.

Let us define groups:

Let A be a set of elements a, b, c . . .

Let us assume that the elements are related by the operation (or binary relation), T:

$$c = a \ q \ T \ b \text{ where a, b and c} \in A.$$

Thus, any set A is called a group if it fulfils the following conditions:

associativity: $\forall a, b \in A$, $$a \ T \ (b \ Tc) = (a \ T \ b) \ T \ c$$

identity: $\exists e \in A$, $$e \ T \ a = a, \forall a \in A$$

converse: $\forall a \in A, \exists \bar{a} \in A,$ $$a \ T \ \bar{a} = \bar{a} \ T \ a = e$$

When the operation T is commutative, (a T b=b T a, $\forall a, b \in A$), the group is called an Abelian group. The order of a group is the number of elements of this group.

Let us define cyclic groups:

Consider a finite group (having a finite number of elements) and the successive operations:

$$a \ T \ a, a \ T \ a \ T \ a, a \ T \ a \ T \ a \ T \ a, \ldots$$

Each of these operations produces an element of the group. Since this group is finite, the sequence will necessarily repeat itself with a period r.

r is called the order of the element a.

If the order of an element g is the same as the order of the group, all the elements of the group are generated by g with the operations:

$$g, g \ T \ g, g \ T \ g \ T \ g \ldots$$

In this case, g is called a generating element of the group. The group is a cyclic group.

Let us define a ring and a field:

A set A is a ring for the two operations T and o if the following conditions are met:

A is an Abelian group for the law T:

if c=a o b, $\forall$ a and b$\in$A, then c$\in$A;

associativity: a o (b o c)=(a o b) o c;

distributivity: a o (b T c)=(a o b) T (a o c) and (b T c) o a=(b o a) T (c o a).

The ring is commutative if the law o is commutative. The ring is a unitary ring if there is one (and only one) identity element u for the law o.

It is easily ascertained that the set of whole numbers is a ring with respect to addition and multiplication.

If we add the condition that every element a has one (and only one) converse $\bar{a}$, (a o $\bar{a}$=u), then the unitary ring becomes a field.

It is easily ascertained that, for any whole prime number p, the set of whole numbers (0, 1, 2, . . . , p−1) constitutes a field for addition and multiplication modulo p.

Any finite field is called a Galois field marked GF(p).

It can be shown that, in any Galois field, there are g primitive roots (or generating elements) which generate all the elements of the field (except e) by the successive operations: g o g, g o g o g, ...

Let K be a commutative field. It is said that L is an extension of K, if L is an extension field of K (namely a field for which K is a subfield) for which every element is a root of an equation of a fixed degree n with coefficients in K. n is the degree of L with respect to K.

For example, the field of complex numbers C is a degree 2 extension field of the field of real numbers R for any complex number $Z=a+ib$ is the root of a second degree equation with real coefficients.

$$z^2-2az+a^2+b^2=0$$

When K is a finite body GF (p) the order d extensions of GF(p) are written: $GF(p^d)$. These fields have a number of elements equal to $p^d$, where p is a prime number and d is a positive whole number.

Let us define the ideal of a ring.

An ideal I of a commutative ring A is a sub-ring of A such that if we take any element y of I and any element a of A, the element a.y still belongs to I.

Let A be a unitary commutative ring. The subset of A, formed from multiples of an arbitrary element of A, is called the principal ideal of A. A ring having only principal ideals is called a principal ring.

The intersection of two ideals contains at least one null element (e) and is still an ideal.

The sum of two ideals is one ideal.

The product of two principal ideals I (a) and I (b) is the principal ideal I (a.b).

Two ideals are said to be comaximal or relatively prime numbers if their sum is the ring itself.

A non-trivial ideal (different from {e} or (A) is a maximal or an absolute prime or a prime ideal, if it is not contained in any ideal other than the ring A itself.

The product of two prime ideals is their intersection.

Given an ideal I in a commutative ring A and an element x of A, the set of elements of the form $y=x$ where y is any element of I is called the coset of I, characterized by x.

If two cosets have an element in common, they coincide. This means that each element of A belongs to one and only one coset of I. The sum and the product of two cosets both belong to one and the same coset called the sum or product of two cosets. The cosets of the ideal I, with reference to these sum and product operations, constitute a ring which is called the quotient ring of A with respect to the ideal I, written A/I. For an ideal I to be maximal, it is necessary and sufficient for the ring quotient A/I to be a body.

Morphisms are the applications between structures.

The study of any algebraic structure includes that of the morphisms for this structure.

The term morphism (or homomorphism) implies an application of one set in another which preserves the "form", namely is compatible with the structures. Thus, there are morphisms among groups, rings, vector spaces, algebras, modules etc.

The definition of morphism is extended to include the case of sets provided with algebraic structures: let E and F be two sets provided with algebraic structures (S) and (T). The following are taken as being given: an application associating an internal law T relative to (T) with each internal law ⊥ relative to (S) and an application associating an external law on F with each external law on E. These two laws have the same operator set, the applications considered being bijective. It is said then that an application f of E in F is a morphism in relation to the structures (S) and (T) if, for each law on E, and for any pair (x, y) of elements of E, $$f(xy)=f(x)T f(y)$$

and if, for each external law of E, of the operator set Ω, and for every element (α,x), of Ω×E.

$$f(\alpha x)=\alpha f(x).$$

A bijective morphism of E on F is an isomorphism: the properties of E are "transported" to F (and reciprocally).

Let us define the bases of a vector space.

Let E be a vector space defined on a commutative body K and ($a_i$), i=1, ..., n a family of vectors of E. This family is a base of E if it is free and generating which amounts to saying that any vector a of E is written uniquely:

$$a=a_1a_1+a_2a_2+ \ldots +a_na_n \; a_i \epsilon K, i=1, \ldots, n$$

The definition of a base is closely related to the notion of a sum and a direct sum of vector sub-spaces.

It is said that this sum $E_1+E_2$ of two vector sub-spaces $E_1$ and $E_2$ of E is direct, and it is written $E_1+E_2$ if, for any vector of this sum, the factorization of:

$x=x_1+x_2$, $x_1 \epsilon E_1$, $x_2 \epsilon E_2$ is unique.

The value of the notion of the base appears in the following result:

let E and F be two vector spaces on K, $B=(e_j)$ j=1, ..., n a base of E, and ($y_j$), j=1, 2 ..., n a group of elements of F. There is then one and only one linear application f of E such that for all j=1, 2, ... n.

$f(e_j)=y_j$.

If, moreover, F is provided with a base $C=(g_i)$, i=1, 2, ... k, the vectors $y_j$ can be defined by their components in the base C:

$$y_j = \sum_{i=1}^{k} a_{ij} g_j$$

Thus, a linear application is defined by the datum of the family $a_{ij}$, for i=1, 2, ..., k and j=1, 2, ..., n.

This is the principle of matrix computation.

Let us define an algebra on a commutative field.

This frequently encountered algebraic structure is closely related to the notion of vector space.

Let K be a commutative field. The term algebra on K designates a vector space E on K provided with a bilinear application of E×E in E. Since an application of E×E in E is what is called an internal law of composition, the set E is therefore provided with an algebraic structure defined by the given facts of three laws of composition:

an internal law of composition, the application of E×E in E, written +;

a second internal law of composition, the application of E×E in E, written (x,y)→xy;

an external law of composition, the application of K×E in E written (α, x)→αx).

These three laws meet the following conditions:

provided with the first and third relationship, E is a vector space on K;

for any triplet (x, y, z) of elements of E, $$x(y+z) = xy + xz$$

$$(y+z)x = yx + zx$$

for any pair (x,y) of elements of E and for any pair ($\alpha$, $\beta$) of elements of K.

$$(\alpha x)(\beta y) = (\alpha\beta)(xy)$$

The definitions relating to vector spaces apply, of course, to algebras. Furthermore, certain properties are related to the second internal law of composition. Thus, an algebra is commutative or associative if the multiplication is so. The algebra is unitary if the multiplication allows a neutral element.

An associated algebra may be considered as a ring (for both internal laws of composition).

Let us define the modules and algebras on a unitary commutative ring.

We shall now go from the notion of vector space to that of the modulus in simply replacing the commutative field K by a unitary commutative ring A. The essential value of this extension is that any unitary commutative ring may be considered to be a modulus on itself. Similarly, any commutative group may be considered to be a modulus on the ring Z of rational whole numbers. Thus, the methods of linear algebra apply to the theory of groups and to the theory of rings.

Equally, the notion of algebra on a commutative body can be extended to that as algebra defined on a unitary commutative ring.

The theory of moduli diverges appreciably from that of vector spaces, for certain theorems of existence may be shown to be at fault. This comes from the fact that a part reduced to a non-null element is not necessarily free.

It is said that a modulus is free if it has at least one base.

It is possible to represent any number in residual notation by using the Chinese remainder theorem.

Let $m_1, m_2, \ldots m_k$ be whole numbers which are relatively prime two by two:

$$(m_i, m_j) = 1, \text{ for } i \neq j.$$

Then the system of linear congruences:

$$x \equiv x_i \bmod m_i, \text{ for } i = 1, 2, \ldots, k$$

has a unique solution x modulo q, given by:

$$x = \sum_{i=1}^{k} x_i \cdot M_i \cdot M_i^{-1} \bmod q, \ 0 \leq x < q$$

where $$q = \prod_{i=1}^{k} m_i = m_1 \cdot M_1 = m_2 \cdot M_2 = \ldots = m_k \cdot M_k$$

and where $M_i^{-1}$ uniquely (modulo $m_i$) meets the congruence:

$$M_i M_i^{-1} \equiv 1 \bmod m_i, \text{ for } i = 1, 2, \ldots, k$$

Representation of numbers:

The Chinese remainder theorem thus formulated warrants the existence of a one-to-one correspondence between the one-dimensional representation of a whole number x, and the multi-dimensional representation which forms its residual expression $(x_1, x_2, \ldots, x_k)$:

$$x \longleftrightarrow (x_1, x_2, \ldots, x_k) \bmod (m_1, m_2, \ldots, m_k)$$

However, the residual notation can hardly be exploited when a number is to be interpreted or its sign is to be tested, or, again, it has to be compared with another number.

Let us define the combined base positional notation:

$$x \longleftrightarrow \begin{pmatrix} \ldots, x_3, x_2, x_1, x_0; x_{-1}, x_{-2}, \ldots \\ \ldots, b_3, b_2, b_1, b_0; b_{-1}, b_{-2}, \ldots \end{pmatrix} = \ldots + x_3 b_2 b_1 b_0 +$$

$$x_2 b_1 b_0 + x_1 b_0 + x_0 + x_{-1}/b_{-1} + x_{-2}/b_{-1}b_{-2} + \ldots$$

With: $0 \leq x_i < b_i$ for any i.

This notation is used especially when working with whole numbers.

Thus, for the example envisaged, in assuming:

$$b_i = M_{i+1}, i = 0, 1, 2$$

$$x \longleftrightarrow \begin{pmatrix} 0, 4, 1 \\ 7, 5, 3 \end{pmatrix} = 0 \cdot (5 \cdot 3 \cdot 1) + 4 \cdot (3 \cdot 1) + 1$$

$$y \longleftrightarrow \begin{pmatrix} 1, 2, 1 \\ 7, 5, 3 \end{pmatrix} = 1 \cdot 15 + 2 \cdot 3 + 1$$

It can also be ascertained that this notation is unique and ordered.

Thus, in the device according to the invention, the numbers of the positional notation are converted into residual notation. The desired additions, subtractions and multiplications are made, and then the results are converted into positional notation or combined base notation for display and/or for their later use. It is advantageous to perform a maximum number of operations before the conversion to limit the number of conversions needed to perform a given computation.

The remarkable property of the residual notation comes from the fact that the addition and multiplication operations are performed independently on each digit (residue).

Let Soient $(m_1, m_2, \ldots m_k)$, $(m_i, m_j) = 1 \ \forall i \neq j$, $q = \prod_{i=1}^{k} m_i$ Take x, y for which we adopt the following residual notation:

$$x = \begin{bmatrix} x_1, x_2, \ldots, x_k \\ M_1 M_1^{-1}, M_2 M_2^{-1}, \ldots, M_k M_k^{-1} \end{bmatrix} \bmod (m_1, m_2, \ldots, m_k)$$

$$y = \begin{bmatrix} y_1, y_2, \ldots, y_k \\ M_1 M_1^{-1}, M_2 M_2^{-1}, \ldots, M_k M_k^{-1} \end{bmatrix} \bmod (m_1, m_2, \ldots, m_k)$$

-continued
$$x = x_1 M M_1^{-1}, x_2 M_2 M_2^{-1} + \ldots + x_k M_k M_k^{-1}$$

$x_1$ being the residue modulo $m_1$, $x_2$ being the residue modulo $m_2$ and $x_k$ being the residue modulo $m_k$.

$$x + y = x_1 M_1 M_1^{-1} + x_2 M_2 M_2^{-1} + \ldots + x_k M_k M_k^{-1} +$$
$$y_1 M_1 M_1^{-1} + y_2 M_2 M_2^{-1} + \ldots + y_k M_k M_k^{-1}$$

$$x + y = (x_1 + y_1) M_1 M_1^{-1} +$$
$$(x_2 + y_2) M_2 M_2^{-1} + \ldots + (x_k + y_k) M_k M_k^{-1}$$

But it is possible to write, for any i:

$$x_i + y_i = z_i + r_i m_i \text{ (giving } x_i + y_i z_i \bmod m_i\text{)}$$

And hence:

$$x + y = z_1 M_1 M_1^{-1} + z_2 M_2 M_2^{-1} + \ldots + z_k M_k M_k^{-1} +$$
$$q \sum_{i=1}^{k} r_i M_i^{-1}$$

since, by definition, $q = m_i \cdot M_i$.

$$z = x + y =$$

$$\begin{bmatrix} z_1, z_2, \ldots, z_k \\ M_1 M_1^{-1}, M_2 M_2^{-1}, \ldots, M_k M_k^{-1} \end{bmatrix} \bmod (m_1, m_2, \ldots, m_k)$$

where $$z_i \equiv x_i + y_i \bmod m_i, \text{ for } i = 1, 2, \ldots, k$$

Hence $$\begin{cases} z = x + y = z_1 M_1^{-1} + \ldots + z_k M_k M_k^{-1} \bmod q \\ \text{with } z_i \equiv x_i + y_i \bmod m_i, \text{ for } i = 1, 2, \ldots, k \end{cases}$$

Similarly:

$$t = x \cdot y = \left( \sum_i x_i M_i M_i^{-1} \right) \cdot \left( \sum_j y_j M_j M_j^{-1} \right)$$

$$t = x \cdot y = \sum_i x_i y_i M_i M_i M_i^{-1} M_i^{-1} + \sum_{\substack{i,j \\ i \neq j}} x_i y_j M_i M_j M_i^{-1} M_j^{-1}$$

But:

$$M_i M_j = \frac{\pi m_i \cdot \pi m_j}{m_i \cdot m_j}$$

$$= \frac{\pi m_i \cdot q}{m_i m_j} \quad \text{pour } i \neq j$$

$$= K \cdot q \quad \text{pour } i \neq j$$

where K is a constant and therefore:

$$t = x \cdot y = \sum x_i y_i M_i M_i M_i^{-1} M_i^{-1} + K' q$$

where K' is a constant.

Furthermore, it is possible to write:

$$M_i M_i^{-1} = \beta_i m_i + 1, \text{ since } M_i M_i^{-1} \equiv 1 \bmod m_i \text{ by definition}$$

Then, $$t = x \cdot y = \sum_i x_i y_i (\beta_i m_i + 1) M_i M_i^{-1} + K' q$$

$$t = x \cdot y = \sum_i x_i y_i M_i M_i^{-1} + \sum_i x_i y_i \beta_i m_i M_i M_i^{-1} + K' q$$

and since $q = m_i M_i$, we get:

$$t = x \cdot y = \sum_i x_i y_i M_i M_i^{-1} + K'' q$$

where K is a constant.

$$t = x \cdot y =$$

$$\sum \begin{bmatrix} t_1, t_2, \ldots, t_k \\ M_1 M_1^{-1}, M_2 M_2^{-1}, \ldots, M_k M_k^{-1} \end{bmatrix} \bmod (m_1, m_2, \ldots, m_k)$$

where $$t_i \equiv x_i y_i \bmod m_i, \text{ for } i = 1, 2, \ldots, k$$

(we might note that uniqueness implies $0 \leq x, y, z, t < q$).

Hence $$t = x \cdot y \equiv t_1 M_1 M_1^{-1} + t_2 M_2 M_2^{-1} + \ldots + t_k M_k M_k^{-1} \bmod q$$

with $$t_i \equiv x_i y_i \bmod m_i, \text{ for } i = 1, 2, \ldots, k$$

It is observed that there is no carry over in residual arithmetic and this is the major contrast with standard traditional arithmetic. For, it is well known that, in this latter representation, the adding and multiplication operations cannot be done separately on each digit since a major piece of information, the carryover, should be transmitted from digit to digit from the less significant value to the more significant value.

Advantageously, a complex arithmetic is defined on a ring. In this case, in addition to the independence of the sum on each residue, the computations are simplified by the fact that a complex multiplication amounts to an index addition, namely, an addition of two whole numbers.

Until now, we have remained at the elementary level of the operations, in building appropriate arithmetics in the manner in which numbers are represented. We shall now use algebraic language and leave the operation level to make a closer examination of structural relationships between sets of numbers provided with laws of composition such as addition and multiplication.

Let $R_1, R_2, \ldots, R_k$ be unitary commutative rings.

The direct sum (also called the Cartesian product) of $R_1, \ldots, R_k$ written:

$$R = \underset{i=1}{\overset{k}{+}} R_i$$

is the set of k-uplets:

$$\underset{i=1}{\overset{k}{+}} R_i = \{(r_1, r_2, \ldots, r_k), r_i \in R_i\}$$

R constitutes a unitary commutative ring for the addition and multiplication operations component by component.

Let R be a finite, commutative and unitary ring.

R allows a unique factorization in direct sums of local rings.

A local ring is a unitary commutative ring which has one (and only one) maximal ideal M. In a local finite ring, M contains all the divisor elements of zero and the element zero.

The factorization into local rings is based on the Chinese remainder theorem which we can formulate thus:

Let Y be a unitary commutative ring and let A be an ideal of Y which can be factorized into a product of relatively prime ideals:

$$A = A_1 A_2 \ldots A_k, \quad A_i + A_j = Y \text{ for } i = j$$

then, the quotient ring Y/A is isomorphous with the direct sum of local rings.

$$Y/A \approx Y/A_1 + Y/A_2 + \ldots + Y/A_k$$

The ring of whole number residual cosets modulo q R(q), can be factorized into the direct sum:

$$R(q) \approx \underset{i=1}{\overset{k}{+}} R(m_i)$$

where $(m_i, m_j) = 1$ for $1 \neq j$ and $q = \underset{i=1}{\overset{k}{\pi}} m_i$ The factorization of a ring R into local finite rings takes place naturally when R is the homomorphic image of a ring I with respect to an ideal which can be factorized in a product of maximal ideals: this is the case, especially, when Y is the ring of whole numbers of a field of algebraic numbers.

A Dedekind domain has the property wherein every ideal can be factorized into a product of maximal ideals and, in fact, every non-null prime ideal is maximal (the ring is Noetherian): the ring of whole numbers of a field of algebraic numbers is a Dedekind domain and is Noetherian.

Take k whole numbers $m_1, m_2, \ldots m_k$ for which $(-1)$ is a quadratic non-residue.

Let $$q = \underset{i=1}{\overset{k}{\pi}}$$

and let R (q) be the unitary commutative ring of whole numbers modulo q.

Then $(-1)$ is a quadratic non-residue of q.

Let $\hat{1}$ be a solution of $x^2 = -1$ found in R $(q^2)$, where:

$$R(q^2) = \{(a + \hat{1}b), a \text{ and } b R(q))\}$$

Let us define the addition and multiplication operations in $R(q^2)$ by:

$$(a + \hat{1}b) + (c + \hat{1}d) = (a+c) \bmod q + \hat{1}(b+d) \bmod q$$

$$(a + \hat{1}b).(c + \hat{1}d) = (ac - bd) \bmod q + \hat{1}(ad + bc) \bmod q$$

The set $R(q^2)$ consists of Gaussian whole numbers similar to the ordinary complex numbers with $\hat{1}^2 = -1$.

Then, $R(q^2)$ is a commutative and unitary finite ring.

Take k prime whole numbers $m_1, m_2, \ldots m_k$, such that $(-1)$ is a quadratic non-residue of each, and assume:

$$q = \underset{i=1}{\overset{k}{\pi}} m_i$$

Let $R(q^2) = \{a + \hat{1}b, 0 \leq a, b < q\}$ be the ring defined above.

Then the direct sum of the Galois field:

$$S(q^2) = GF(m_1^2) \oplus GF(m_2^2) \oplus \ldots + GF(m_k^2)$$

$$S(q^2) = \{(\alpha_1, \alpha_2, \ldots, \alpha_k), \alpha_i \in GF(m_i^2), i = 1, 2, \ldots, k\}$$

where the addition and multiplication operations are defined by:

$$(\alpha_1, \alpha_2, \ldots, \alpha_k) + (\beta_1, \beta_2, \ldots, \beta_k) = (\alpha_1 + \beta_1, \alpha_2 + \beta_2, \ldots, \alpha_k + \beta_k)$$

$$(\alpha_1, \alpha_2, \ldots, \alpha_k).(\beta_1, \beta_2, \ldots, \beta_k) = (\alpha_1.\beta_1, \alpha_2.\beta_2, \ldots, \alpha_k.\beta_k)$$

is a ring of $q^2$ elements, isomorphous at the ring $R(q^2)$.

Every Galois field GF $(m_i^n)$ has generating elements g generating all the elements of the field except the element 0 by successive multiplication operations:

$$g.g, g.g.g, \ldots$$

The set $\{0, 1, 2, \ldots m_i^2 - 2\}$ provided with the addition modulo $(m_i^2 - 1)$ is an Abelian group, isomorphous with the cyclic group $[GF(m_i^2) - \{o + \hat{1}0\}]$ generated by g with the multiplicative law.

Thus, we see that a judicious choice of the whole number q can be used to build diverse algebraic structures on the ring R(q) provided with very valuable properties which can be transposed by isomorphism:

the ring $R(q^2)$ considered as an algebra defined on R(q) (or as a modulus on R(q)), has an orthogonal base enabling component-by-component operation on the elements of $R(q^2)$ expressed in this canonical base.

Through the isomorphism between the group of indices and the cyclic group of the Galois field $GF(m_i^2)$, there is remarkably simple means available to perform a complex multiplication in a single operation of real addition on the indices of the elements;

the ring R(q), considered as an algebra (or a modulus) on itself, also has an orthogonal basis. Consequently, the elements of R(q), which are also the real and imaginary components of complex whole numbers of $R(q^2)$ can be factorized on this basis and can be worked separately by component.

In an algebra defined on a field (or a vector space on a field), the associated bases all have the same dimensions. This is no longer true with an algebra or a modulus defined on a ring. A modulus is free if it has a basis. In the case of R(q) and $R(q^2)$, there is at least one base (the algebraic interpretation of the Chinese remainder theorem). In particular, for R(q), the standard formulation of the theorem gives the orthogonal canonic base $(b_i = M_i M_i^{-1})$. For:

$$b_1 = M_1 M_1^{-1} = (1,0,0,\ldots,0) \bmod (m_1, m_2, \ldots, m_k)$$
$$b_2 = M_2 M_2^{-1} = (1,0,0,\ldots,0) \bmod (m_1, m_2, \ldots, m_k)$$
$$\vdots$$
$$b_k = M_k M_k^{-1} = (0,0,0,\ldots,1) \bmod (m_1, m_2 \ldots, m_k)$$

The positional notations, in base b (or in combined bases) define other bases which do not necessarily have the "dimension" k.

A problem of processing on complex data, where the real and imaginary parts are written in a non-orthogonal base (binary positional notation for the computer, and decimal notation for man) is conventionally performed without changing the base (the positional notation is kept). Consequently, it becomes necessary to use a heavy arithmetic with a spreading of carry-over.

The complex residual arithmetic proposed therefore consists in transposing the problem in an orthogonal base (residual notation) to benefit from the "orthogonal" arithmetic. We even go further than that in reducing the complex multiplication operation to an indices addition operation. Once the operation entails assessing the amplitude of a result or comparing results, the base is again changed to return to a positional notation (preferably one with combined bases, since it has the same dimension as the residual notation). Finally, an additional transcription is done in binary notation if this proves to be necessary.

To build a complex arithmetic on a ring, it is necessary to choose, as elements of the residual base, the numbers $m_i$ for which the number $-1$ is a quadratic non-residue. The numbers are given by the formula:

$$m_i = 4k + 3$$

where k is a whole number.

Figure 1:
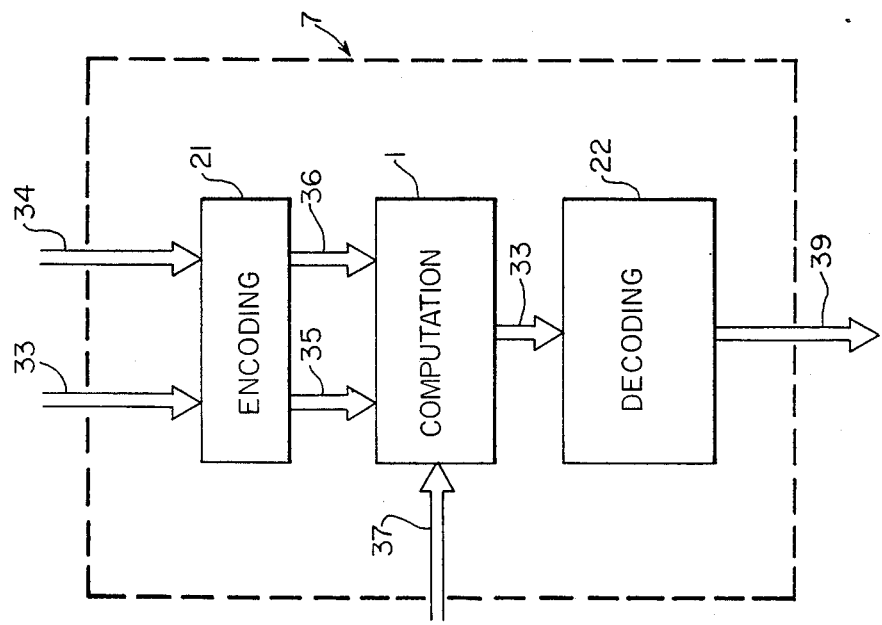
FIG. 1 is a diagram of the first alternative embodiment of the device according to the invention.

FIG. 1 shows a first embodiment of a computer 7 according to the invention. The computer 7 has an encoding module 21, a computing module 1 and a decoding module 22. The encoding module 21 is connected to at least one data bus 33 and/or 34. The encoding module 21 is connected to the computing module 1 by at least one data bus 35 and/or 36. The computing module 1 is connected to the decoding module 22 by a data bus 33. The decoding module 22 is connected to a data bus 39.

The encoding module 21 receives successively, through a single bus, or simultaneously, through both buses 33 and 34, two items of digital data in positional notation.

The encoding module 21 converts the digital data from the positional notation into residual notation.

For example, the items of digital data are received in binary form by the encoding module 21 and are encoded in residual notation where the digits are encoded in binary form for technological reasons.

The computing module 1 receives successively, through a single bus, or simultaneously, through both buses 35 and 36, two items of digital data in positional notation. The computing module 1 performs, on both items of data, the computation for which it has been designed, for example, addition, subtraction or multiplication. In an alternative embodiment, the subtraction of a number is replaced by the addition of its opposite.

The decoding module 22 receives the result of the computation performed by the computing module 1 through the bus 33. This result is received in positional notation. The decoding module 22 converts this result of the computation in residual notation into a notation which can be more easily used, such as, for example, the combined base notation, binary notation, hexadecimal or decimal notation.

The result, having been made easy to use, is emitted on the bus 39.

Advantageously, the computing module is connected to a control bus 37. In this case, one and the same computing module 1 can be used depending on the command it receives through the bus 37, to perform an addition, a subtraction or a multiplication or even a division if this operation is possible in residual notation.

Advantageously, the computing module 7 is a pipeline device. At the $k^{th}$ clock cycle, the encoding module 21 performs a conversion of two order k data from the positional notation into residual notation, the computing module 1 performs an operation, for example, addition, on two order $k-1$ digital data while the decoding module 22 converts the order $k-2$ result from the residual notation into positional notation.

Figure 2:
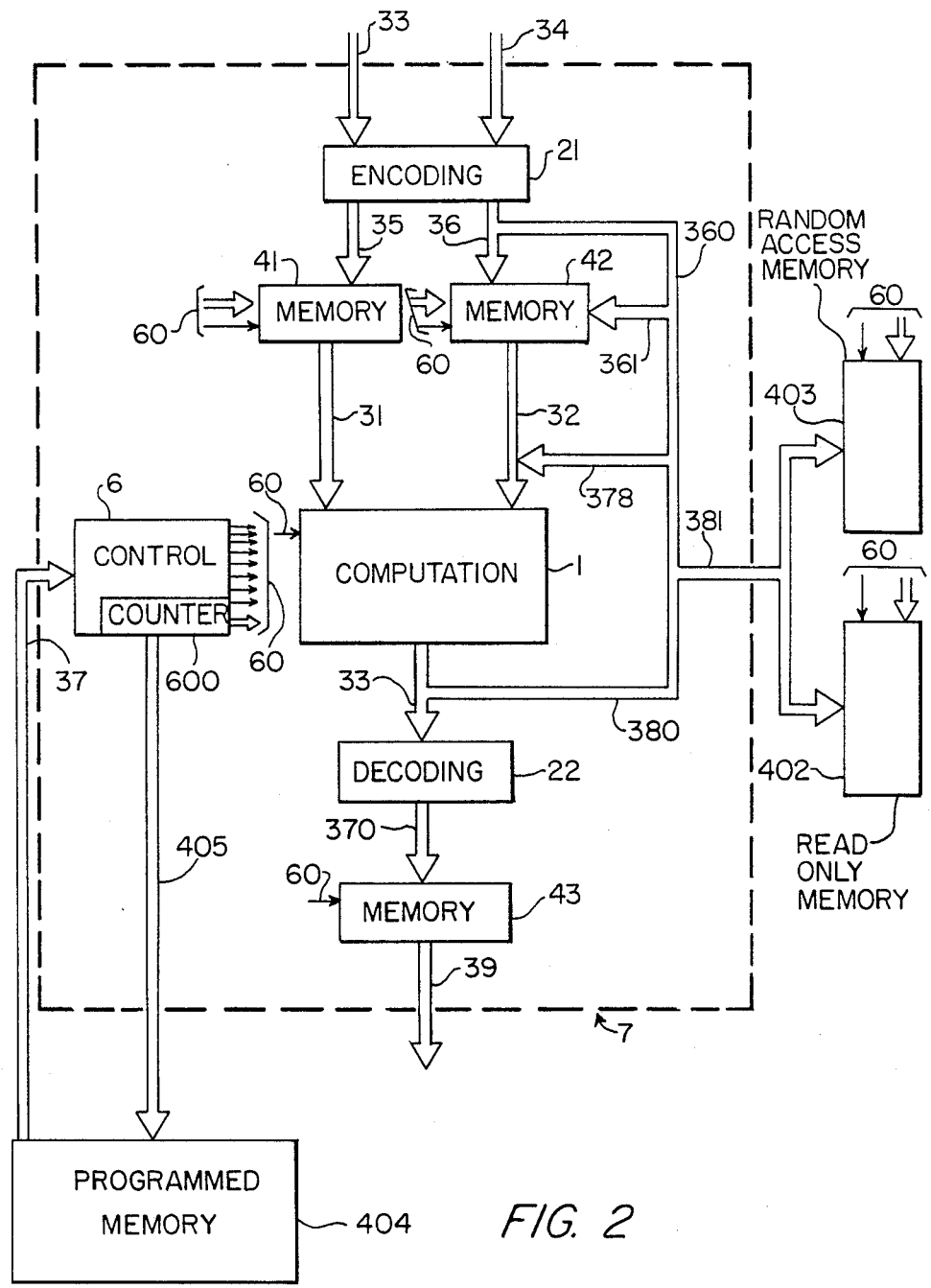
FIG. 2 is a diagram of a second alternative embodiment of the device according to the invention.

FIG. 2 shows a particularly efficient embodiment of the computing device according to the invention. This device is especially well suited to complex computations, sequences of computations as well as computations repeatedly using the same data. This type of computation is used notably in digital filtering.

The computing device of FIG. 2 comprises, in addition to the encoding module 21, the computing module 1 and the decoding module 22, a control module 6.

The control module 6 enables the successive execution of several computations using, for example, the same piece of data in residual notation several times or using the result of a computation as a piece of data for one of the following computations.

The computing device 7 according to the invention has means 41, 42, 382, 402, 403, used to provide a same piece of data several times to the computing module 1 without its being necessary to pass from the positional notation to the residual notation several times.

The computing device according to the invention comprises, for example, two memories 41 and 42 connected between the encoding module 21 and the computation module 1.

For example, the memory 41 receives data from the encoding module 21 through a bus 35 and sends data to the computing module 1 through a bus 31.

For example, the memory 42 receives data from the encoding module 21 through a bus 36 and sends data to the computing module 1 through a bus 32.

Advantageously, the results of computation by the computing module 1 can be given to the input of said computing module 1, for example, through a bus 380, a bus 378 and a bus 32.

Advantageously, the results of computation by the computation module 1 are capable of being given to the input of one of the memories 41, 42, for example, through the bus 380, a bus 360 and the bus 36.

Advantageously, the results of computation by the computing module 1 are capable of being given to a random access memory 403, for example, a memory external to the computing device 7, for example, through the bus 33, the bus 380 and the bus 381.

Advantageously, the digital data in residual notation are capable of being given to the computing module 1, for example, through a bus 381, the bus 378 and the bus 32 from a read-only memory 402 or the random-access memory 403.

In one exemplary embodiment of the device according to the invention, the read-only memory 402 is external to the computing device 7.

In a second exemplary embodiment, the read-only memory 402, included in the computing device 7, is a programmable read-only memory (PROM, EPROM or EEPROM).

Advantageously, the digital data in residual notation can be given to one of the memories 41 or 42 by the random-access memory 403 and/or the read-only memory 402, for example, through the bus 381, the bus 360 and the bus 36.

Advantageously, the digital data are capable of being given by the encoding module 21 to the random-access memory 403, for example, through the bus 36, the bus 360 and the bus 381.

Of course, no combination of data paths specified above goes beyond the scope of the present invention.

In a first exemplary embodiment, the memories 41 and 42 are buffer memories capable each of storing a piece of digital data in residual notation. Each new piece of data erases the old one.

In a second exemplary embodiment of the device according to the invention, the memories 41 and/or 42 are shift registers capable of storing n data simultaneously. In response to each control signal 60, the digital values stored are shifted by one rank, the rank n digital values being emitted to the bus 31 or 32.

Advantageously, upon a command 60 emitted by the control module 6, a digital value can be stored by means of the bus 61 in any of the shift registers comprising memory 41 and/or 42. For example, if it is desired to have, at one of the inputs of the computation module 1, a digital value in two computation cycles, said digital value is stored in the index register n−2 of the memory 41 or 42 connected to said input of the computation module 1.

In a third embodiment of the device according to the invention, the memories 41 and/or 42 are random-access memories (RAMs). The control module 6 controls and addresses the memories 41 and 42.

Advantageously, the decoding module 22 is connected to a buffer memory 43 by means of a bus 370. The buffer memory 43 enables the computation results to be given by means of a bus 39.

The read-only memory 402 is used to store coefficients which may be used during the computation. The coefficients are converted into residual notation only once, before the memory 402 is programmed.

The random-access memory 43 is used to store intermediate results and/or data which are liable to be used several times in residual notation. Furthermore, when the encoding module 21 is free, it is possible to store in residual notation, in the memory 403, as an when available, digital values coming, for example, from a data acquisition device (not shown) connected, for example, to the bus 34.

Advantageously, a memory 404 is connected by means of a bus 37 to the control module 6. The memory 404 can store instructions of the program enabling the computing device 7 be made to perform to the desired computations. The instructions stored in the memory 404 enable the control module 6 to shunt the flow of data, to perform activation tasks in reading or in writing and to give an address to the memories 41, 42, 402 and 403 and to control the operation to be executed by the computation module 1.

The memory 404 is, for example, addressed by a counter 600 by means of a bus 405. The counter 600 is, for example, included in the control module 6 memory.

The architecture of the control module 6 is adapted to the computations which it iş desired that the device 7 should be capable of performing, and it is adapted to the modules 1, 21, 22, as well as the memories 41, 42, 402 and 403.

The control module is made in a known way. For example, it has sequencers. These sequencers are made in the form of programmable logic devices (PLD or EPLD) or micro-programmed logic devices.

Advantageously, the instructions of the program stored in the memory 404 are obtained from an appropriate assembler or compiler made in a known way.

For the clarity of the figures, the connection of the control lines 60 have not been shown.

Figure 3:
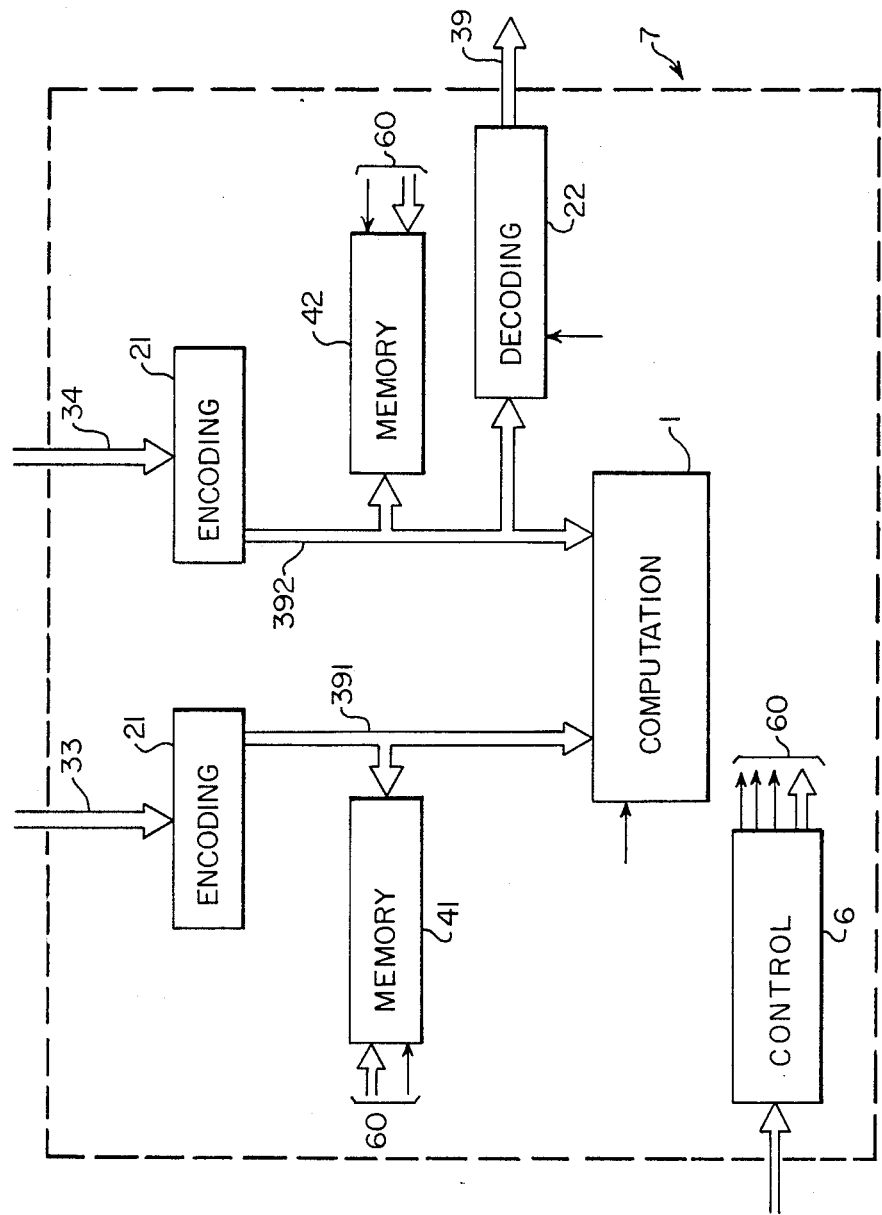
FIG. 3 is a diagram of a third alternative embodiment of the device according to the invention.

FIG. 3 shows an alternative embodiment of the computing device 7. The alternative embodiment shown in FIG. 3 has simplified data paths.

In FIG. 3, the encoding module 21 is shown in the form of two devices 21, respectively charged with converting digital data in positional notation into digital data in residual notation on the buses 33 and 34.

The first of the two encoding devices 21 is connected by a bus 391 to the memory 41 and to a first input of the computing module 1.

The second of the two encoding devices 21 is connected by a bus 392 to the memory 42, the decoding module 22 and the second input of the computing module 1.

The bus 391 enables the first encoding device 21 to give data to the computing module 1 and/or to the memory 41 and also enables two-directional exchanges of data between the memory 41 and the computing module 1.

The bus 392 enables the second encoding device 21 to provide data to the computing module 1 and/or to the memory 42, two-directional exchanges of data between the memory 42 and the computing module 1 as well as the transmission of results of the computing module 1 to the decoding module 22.

The control module 6 supervises exchanges of data and the operations performed by the computing module 1.

Figure 4:
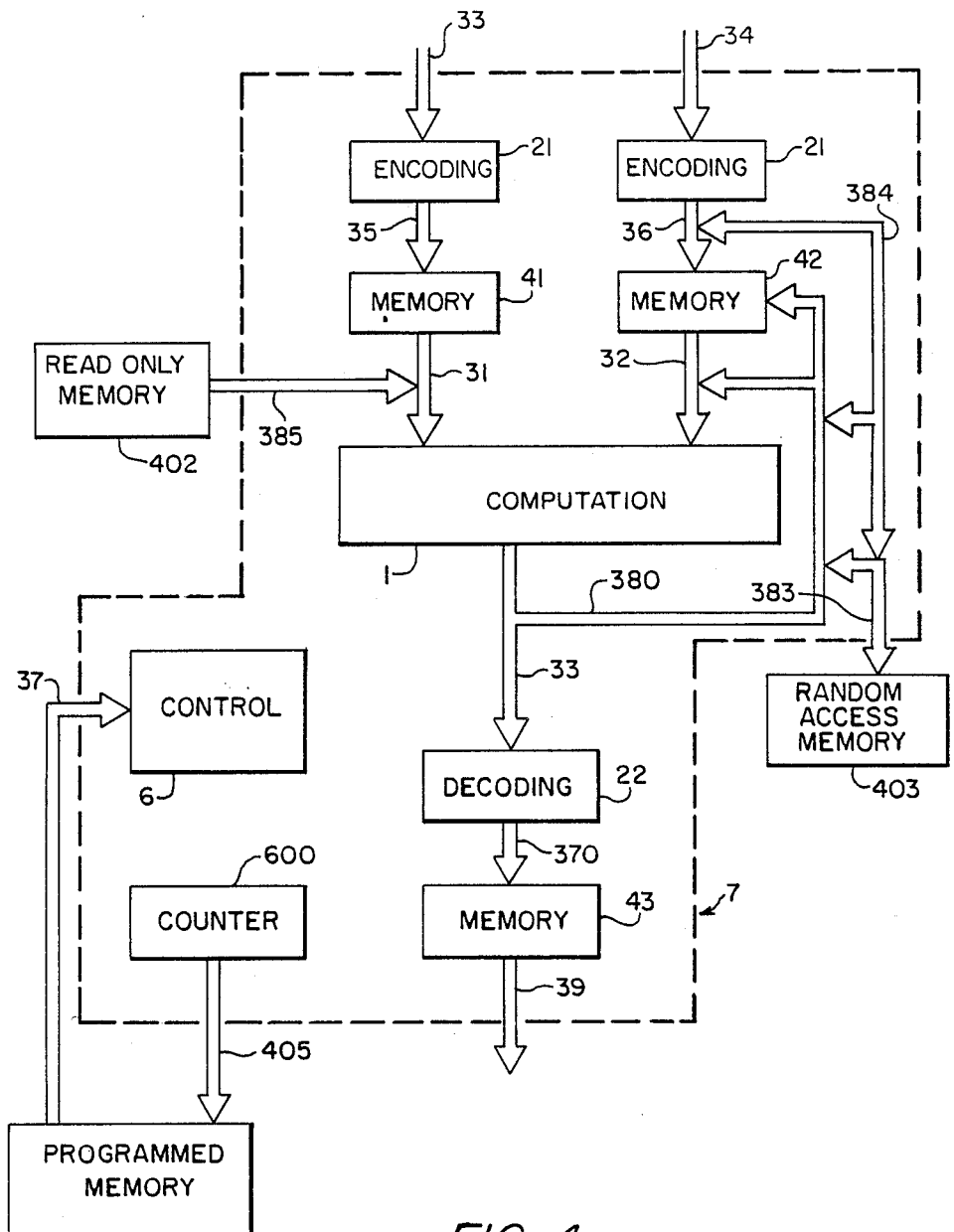
FIG. 4 is a fourth exemplary embodiment of the device according to the invention.

FIG. 4 shows an especially efficient example of an embodiment of the computing device 7 as regards exchanges of data.

A first encoding device 21 is capable of receiving, through the bus 33, a first flow of data to be processed.

The first device 21 is connected by the bus 35 to the memory 41. The memory 41 is connected by a bus 31 to a first input of the computing module 1. To the bus 31, there is connected, through a bus 385, a read-only memory 402. A second encoding device 21 is capable of receiving a second flow of data to be processed through the bus 34.

The second encoding device 21 is connected by a bus 36 to the memory 42. The memory 42 is connected by a bus 32 to a second input of the computing module 1. The output of the computing module 1 is connected by the bus 33 to the decoding module 22. The decoding module 22 is connected by the bus 370 to the buffer memory 43. The buffer memory 43 is connected to a bus 39.

A bus 380 connects the bus 33 to the bus 32 and to the memory 42.

A bus 383 connects a random-access memory 403 to the bus 380 bidirectionally.

A bus 384 connects bus 36 to the bus 380 and to the bus 383.

The computing device 7, shown in FIG. 4, enables simultaneous exchanges of data, notably between:
- the output of the computing module 1 and the second input of the computing module 1 through the buses 33, 380 and 32, and between the encoding device 21 and the random-access memory 403 through the buses 36, 384 and 383;
- the output of the computing module 1 and the second input of the computing module 1 through the buses 33, 380 and 32 and between the encoding device 21 and the memory 42 through the bus 36;
- the output of the computing module 1 and the second input of the computing module 1 through the buses 33, 380 and 32 and between the random-access memory 403 and the memory 42 through the buses 383, 384 and 36;
- the output of the computing module 1 and the decoding module 22 and the various exchanges among the encoding devices 21, the memory 42 and the memory 403.

The possibilities of exchanging data supervised by the control module 6 first enable the use of an encoding device 21 to convert, as and when they become available, digital data in positional notation coming, for example, from a data acquisition device through the bus 34, into digital data in residual notation, and further enables their storage in the random-access memory 403. Second they enable the computing device 7 to directly perform complex computations which are highly useful in digital filtering such as, for example, in convolution computation, correlation computations or weighting computations. The computations are supervised by the module 6 in performing a suitable program stored in the program memory 404.

In an alternative embodiment of the device according to the invention (not shown), the computing device has means to transcode the residual notation into a notation with combined bases (and vice versa) as well as comparators. The transcoding to a combined base (and vice versa) is easier than transcoding between residual notation and positional notation. For, when transcoding in combined base notation, the spatial dimension used is preserved. The combined base notation enables comparison. Thus, during a computation, it is possible to ascertain that a number is greater than another number or that it is below a given threshold. For the remaining computations, the number tested is transcoded in residual notation.

Advantageously, the number tested is stored in a random-access memory before being transcoded. In the rest of the computations, the value which had been stored is used.

Figure 5:
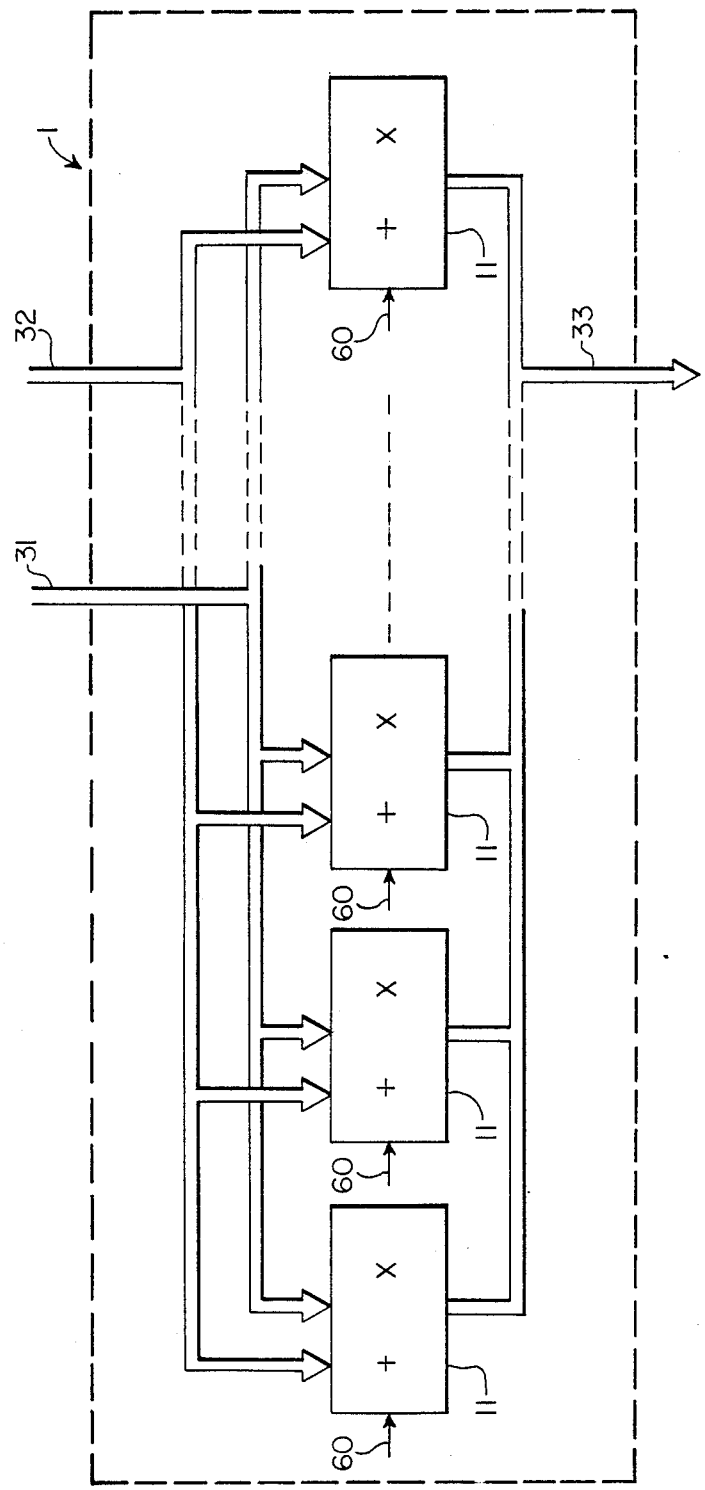
FIG. 5 is a diagram of a detail of the embodiment of the devices according to the invention.

FIG. 5 shows an exemplary embodiment of the computing module 1 of FIGS. 1 to 4. The computing module 1 uses the fact that, in a residual arithmetic, the computations can be performed independently on each digit, without any spreading of carry-over values. Thus, the computing module 1 has several elementary computers 11 capable of performing a computation on a digit in residual notation.

The computation module 1 is connected to two buses 31 and 32. Inside the computation module 1, each of the said buses is divided in order to give elementary computer 11 the desired digit. Each elementary computer 11 receives two digits.

In a first embodiment of the device according to the invention, each elementary computer 11 can perform a single type of operation, for example, multiplication.

Advantageously, the elementary computers 11 are capable of performing the desired operation on receiving a command on lines 60 from the control module 6. For example, the elementary computers 11 are capable of performing, on command, an addition, a subtraction or a multiplication.

Each elementary computer 11 gives the bus 33 the result of the computation made.

In an alternative embodiment, the elementary computer 11 has combinational logic circuits capable of performing the desired computations.

Advantageously, inasmuch as the computations are done independently on each digit, the results of each operation are tabulated. It is possible, in residual arithmetic, to obtain a wide range (on each digit) while, at the same time, using read-only memories of standard capacity, for example, ROMs with 14 address bits.

Figure 8:
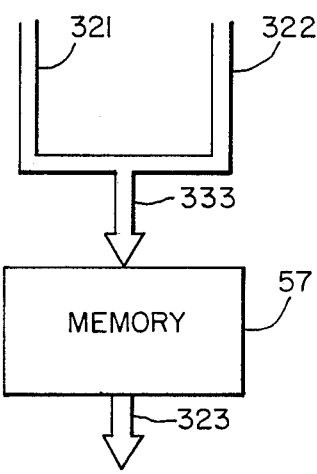
FIG. 8 is a diagram of a prior art principle implemented in the device according to the invention.

An example of an elementary computer using tabulated functions is used in FIG. 5, the principle of the computation using tables stored in the read-only memory being shown in FIG. 8.

Each elementary computer 11 performs the computations separately on a digit.

The computation module 1 has a number of elementary computers 11 which is sufficient to enable the processing of all the digits of the greatest numbers in which it is sought to make computations.

Table 1 gives an example of a computation module 1 comprising 16 elementary processors. These 16 elementary processors can be made by using ROMs with 14 address bits. The numbers $m_i$ of the table I have the form $m_i = 4k + 1$ where k is a positive whole number.

It is clear that a computing module 1 having a greater number of elementary computers 11 is not beyond the scope of the present invention.

TABLE 1

| $m_i$ | Number of elements of $GF(m_i^2)$ | Number of bits to encode $GF(m_i^2)$ |
|---|---|---|
| 3 | 9 | 4 |
| 7 | 49 | 6 |
| 11 | 121 | 8 |
| 19 | 361 | 10 |
| 23 | 529 | 10 |
| 31 | 961 | 10 |
| 43 | 1849 | 12 |
| 47 | 2209 | 12 |

TABLE 1-continued

| $m_i$ | Number of elements of $GF(m_i^2)$ | Number of bits to encode $GF(m_i^2)$ |
|---|---|---|
| 59 | 3481 | 12 |
| 67 | 4489 | 14 |
| 71 | 5041 | 14 |
| 79 | 6241 | 14 |
| 83 | 6889 | 14 |
| 103 | 10609 | 14 |
| 107 | 11449 | 14 |
| 127 | 16129 | 14 |

Depending on the range of the problem considered, an appropriate modulus will be chosen:

$$q = \prod_{i=1}^{k} m_1$$

To ensure the uniqueness of the result, each of its components should be smaller than q, thus imposing constraints on the range of data.

FIG. 6 shows an exemplary embodiment of an elementary computer 11 capable of performing, on a command from lines 60 from the control module 6, a multiplication, addition or subtraction.

A multiplication consists of an association, with each digit of an order index in the group GF ($m_i^2$) and in a summation of the indices obtained.

To obtain the result of a multiplication, it then suffices to convert the index into the number associated with it.

Advantageously, the index association is tabulated in a read-only memory 57.

The adder 55 is a modulo $m_i^2-1$ adder.

Advantageously, one and the same adder 55 is used to do the "adding" operation and to add the indices during a multiplication.

Advantageously, the addition is tabulated in a read-only memory of the adder 55.

However, when the addition modulo $m_i^2-1$ is performed, it is important to deduct $m_i^2-1$ from the result so long as this result is greater than or equal to $m_i^2-1$.

The example of the modulo 8 addition is given in Table III.

Figure 7:
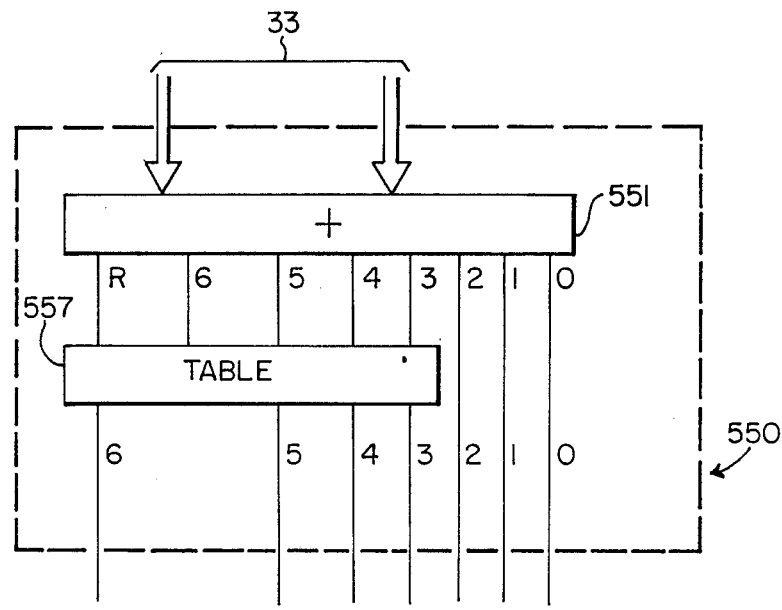
FIG. 7 is a diagram of the devices according to the invention.

An example of a modulo $m^2_{i=3}-1$, namely $11^2-1=120$ is shown in FIG. 7.

Advantageously, the buses 31, 313, 314, 315, 316, 32, 323, 324, 325, 326 and 33 are capable of parallel transmission of both components, namely the real component and the imaginary component, of a digit.

The bus 31 is connected first to a bus 313, and second to a bus 314.

The bus 32 is connected first to a bus 323 and second to a bus 324.

The buses 313 and 323 constitute the address buses of a read-only memory 57. The read-only memory 57 comprises the tabulated indices to be associated in $GF(m_i^2)$ with a complex number with a view to its multiplication by another complex number.

An example of indexing is given by Table II for the first three elementary computers 11. For each computer, the table is arranged in the rising order of numbers and then in the rising order of indices.

Re signifies: real part.
Im signifies: imaginary part.

The element $(0+\hat{1}0)$ is given an index *, for it does not belong to the cyclic group and must be processed separately. A simple logic test device makes it possible to grasp the multiplication by the absorbent element $(0+\hat{1}0)$, the result of which is, of course, this same null element $(0+\hat{1}0)$.

TABLE II

| Re | Im | Indices |
|---|---|---|
| Indices of elements of GF ($3_2$) with $g_1 = 1 + \hat{1}$ as a generating element | | |
| 0 | 0 | * |
| 0 | 1 | 6 |
| 0 | 2 | 2 |
| 1 | 0 | 0 |
| 1 | 1 | 1 |
| 1 | 2 | 3 |
| 2 | 0 | 4 |
| 2 | 1 | 7 |
| 2 | 2 | 5 |
| Indices of elements of GF ($3_2$) arranged in rising order of elements | | |
| 0 | 0 | * |
| 1 | 1 | 1 |
| 0 | 2 | 2 |
| 1 | 2 | 3 |
| 2 | 0 | 4 |
| 2 | 2 | 5 |
| 0 | 1 | 6 |
| 2 | 1 | 7 |
| 1 | 0 | 0 |
| Indices of elements of GF ($7^2$) with $g_2 = 4 + \hat{1}1$ as generating element | | |
| 0 | 0 | * |
| 0 | 1 | 36 |
| 0 | 2 | 4 |
| 0 | 3 | 44 |
| 0 | 4 | 20 |
| 0 | 5 | 28 |
| 0 | 6 | 12 |
| 1 | 0 | 0 |
| 1 | 1 | 2 |
| 1 | 2 | 17 |
| 1 | 3 | 13 |
| 1 | 4 | 43 |
| 1 | 5 | 23 |
| 1 | 6 | 14 |
| 2 | 0 | 16 |
| 2 | 1 | 11 |
| 2 | 2 | 18 |
| 2 | 3 | 39 |
| 2 | 4 | 33 |
| 2 | 5 | 30 |
| 2 | 6 | 29 |
| 3 | 0 | 8 |
| 3 | 1 | 31 |
| 3 | 2 | 21 |
| 3 | 3 | 10 |
| 3 | 4 | 22 |
| 3 | 5 | 3 |
| 3 | 6 | 25 |
| 4 | 0 | 32 |
| 4 | 1 | 1 |
| 4 | 2 | 27 |
| 4 | 3 | 46 |
| 4 | 4 | 34 |
| 4 | 5 | 45 |
| 4 | 6 | 7 |
| 5 | 0 | 40 |
| 5 | 1 | 5 |
| 5 | 2 | 6 |
| 5 | 3 | 9 |
| 5 | 4 | 15 |
| 5 | 5 | 42 |
| 5 | 6 | 35 |
| 6 | 0 | 24 |
| 6 | 1 | 38 |
| 6 | 2 | 47 |
| 6 | 3 | 19 |
| 6 | 4 | 37 |
| 6 | 5 | 41 |
| 6 | 6 | 26 |
| Indices of elements of GF ($7^2$) arranged by rising order of indices | | |

TABLE II-continued

| Re | Im | Indices |
|---|---|---|
| 0 | 0 | * |
| 4 | 1 | 1 |
| 1 | 1 | 2 |
| 3 | 5 | 3 |
| 0 | 2 | 4 |
| 5 | 1 | 5 |
| 5 | 2 | 6 |
| 4 | 6 | 7 |
| 3 | 0 | 8 |
| 5 | 3 | 9 |
| 3 | 3 | 10 |
| 2 | 1 | 11 |
| 0 | 6 | 12 |
| 1 | 3 | 13 |
| 1 | 6 | 14 |
| 5 | 4 | 15 |
| 2 | 0 | 16 |
| 1 | 1 | 17 |
| 2 | 2 | 18 |
| 6 | 3 | 19 |
| 0 | 4 | 20 |
| 3 | 2 | 21 |
| 3 | 4 | 22 |
| 1 | 5 | 23 |
| 6 | 0 | 24 |
| 3 | 6 | 25 |
| 6 | 6 | 26 |
| 4 | 2 | 27 |
| 0 | 5 | 28 |
| 2 | 6 | 29 |
| 2 | 5 | 30 |
| 3 | 1 | 31 |
| 4 | 0 | 32 |
| 2 | 4 | 33 |
| 4 | 4 | 34 |
| 5 | 6 | 35 |
| 0 | 1 | 36 |
| 6 | 4 | 37 |
| 6 | 1 | 38 |
| 2 | 3 | 39 |
| 5 | 0 | 40 |
| 6 | 5 | 41 |
| 5 | 5 | 42 |
| 1 | 4 | 43 |
| 0 | 3 | 44 |
| 4 | 5 | 45 |
| 4 | 3 | 46 |
| 6 | 2 | 47 |
| 1 | 0 | 0 |

Indices of GF ($11^2$) elements with $g_3 = 2 + \hat{i}5$ as a generating element

| Re | Im | Indices |
|---|---|---|
| 1 | 0 | 0 |
| 0 | 0 | * |
| 0 | 1 | 90 |
| 0 | 2 | 6 |
| 0 | 3 | 18 |
| 0 | 4 | 42 |
| 0 | 5 | 114 |
| 0 | 6 | 54 |
| 0 | 7 | 102 |
| 0 | 8 | 78 |
| 0 | 9 | 66 |
| 0 | 10 | 30 |
| 1 | 0 | 0 |
| 1 | 1 | 3 |
| 1 | 2 | 22 |
| 1 | 3 | 95 |
| 1 | 4 | 7 |
| 1 | 5 | 16 |
| 1 | 6 | 56 |
| 1 | 7 | 77 |
| 1 | 8 | 85 |
| 1 | 9 | 2 |
| 1 | 10 | 33 |
| 2 | 0 | 36 |
| 2 | 1 | 92 |
| 2 | 2 | 39 |
| 2 | 3 | 113 |
| 2 | 4 | 58 |
| 2 | 5 | 1 |
| 2 | 6 | 11 |
| 2 | 7 | 38 |
| 2 | 8 | 43 |
| 2 | 9 | 69 |
| 2 | 10 | 52 |
| 3 | 0 | 48 |
| 3 | 1 | 55 |
| 3 | 2 | 13 |
| 3 | 3 | 51 |
| 3 | 4 | 64 |
| 3 | 5 | 50 |
| 3 | 6 | 70 |
| 3 | 7 | 104 |
| 3 | 8 | 81 |
| 3 | 9 | 23 |
| 3 | 10 | 5 |
| 4 | 0 | 72 |
| 4 | 1 | 47 |
| 4 | 2 | 8 |
| 4 | 3 | 74 |
| 4 | 4 | 75 |
| 4 | 5 | 79 |
| 4 | 6 | 29 |
| 4 | 7 | 105 |
| 4 | 8 | 94 |
| 4 | 9 | 88 |
| 4 | 10 | 37 |
| 5 | 0 | 24 |
| 5 | 1 | 26 |
| 5 | 2 | 101 |
| 5 | 3 | 40 |
| 5 | 4 | 119 |
| 5 | 5 | 27 |
| 5 | 6 | 57 |
| 5 | 7 | 109 |
| 5 | 8 | 80 |
| 5 | 9 | 31 |
| 5 | 10 | 46 |
| 6 | 0 | 84 |
| 6 | 1 | 106 |
| 6 | 2 | 91 |
| 6 | 3 | 20 |
| 6 | 4 | 49 |
| 6 | 5 | 117 |
| 6 | 6 | 87 |
| 6 | 7 | 59 |
| 6 | 8 | 100 |
| 6 | 9 | 41 |
| 6 | 10 | 86 |
| 7 | 0 | 12 |
| 7 | 1 | 97 |
| 7 | 2 | 28 |
| 7 | 3 | 34 |
| 7 | 4 | 45 |
| 7 | 5 | 89 |
| 7 | 6 | 19 |
| 7 | 7 | 15 |
| 7 | 8 | 14 |
| 7 | 9 | 68 |
| 7 | 10 | 107 |
| 8 | 0 | 108 |
| 8 | 1 | 65 |
| 8 | 2 | 83 |
| 8 | 3 | 21 |
| 8 | 4 | 44 |
| 8 | 5 | 10 |
| 8 | 6 | 110 |
| 8 | 7 | 4 |
| 8 | 8 | 111 |
| 8 | 9 | 73 |
| 8 | 10 | 115 |
| 9 | 0 | 96 |
| 9 | 1 | 112 |
| 9 | 2 | 9 |
| 9 | 3 | 103 |
| 9 | 4 | 98 |
| 9 | 5 | 71 |
| 9 | 6 | 61 |
| 9 | 7 | 118 |
| 9 | 8 | 53 |
| 9 | 9 | 99 |

TABLE II-continued

| Re | Im | Indices |
|----|----|---------|
| 8 | 10 | 32 |
| 10 | 10 | 60 |
| 10 | 1 | 93 |
| 10 | 2 | 62 |
| 10 | 3 | 25 |
| 10 | 4 | 17 |
| 10 | 5 | 116 |
| 10 | 6 | 76 |
| 10 | 7 | 67 |
| 10 | 8 | 35 |
| 10 | 9 | 83 |
| 10 | 10 | 63 |

Indices of GF $(11^2)$ elements arranged in rising order of indices

| Re | Im | Indices |
|----|----|---------|
| 0 | 0 | * |
| 2 | 5 | 1 |
| 1 | 9 | 2 |
| 1 | 1 | 3 |
| 8 | 7 | 4 |
| 3 | 10 | 5 |
| 0 | 2 | 6 |
| 1 | 4 | 7 |
| 4 | 2 | 8 |
| 9 | 2 | 9 |
| 8 | 5 | 10 |
| 2 | 6 | 11 |
| 7 | 0 | 12 |
| 3 | 2 | 13 |
| 7 | 8 | 14 |
| 7 | 7 | 15 |
| 1 | 5 | 16 |
| 10 | 4 | 17 |
| 0 | 3 | 18 |
| 7 | 6 | 19 |
| 6 | 3 | 20 |
| 8 | 3 | 21 |
| 1 | 2 | 22 |
| 3 | 9 | 23 |
| 5 | 0 | 24 |
| 10 | 3 | 25 |
| 5 | 1 | 26 |
| 5 | 5 | 27 |
| 7 | 2 | 28 |
| 4 | 6 | 29 |
| 0 | 10 | 30 |
| 5 | 9 | 31 |
| 9 | 10 | 32 |
| 1 | 10 | 33 |
| 7 | 3 | 34 |
| 10 | 8 | 35 |
| 2 | 0 | 36 |
| 4 | 10 | 37 |
| 2 | 7 | 38 |
| 2 | 2 | 39 |
| 5 | 3 | 40 |
| 6 | 9 | 41 |
| 0 | 4 | 42 |
| 2 | 8 | 43 |
| 8 | 4 | 44 |
| 7 | 4 | 45 |
| 5 | 10 | 46 |
| 4 | 1 | 47 |
| 3 | 0 | 48 |
| 6 | 4 | 49 |
| 3 | 5 | 50 |
| 3 | 3 | 51 |
| 2 | 10 | 52 |
| 9 | 8 | 53 |
| 0 | 6 | 54 |
| 3 | 1 | 55 |
| 1 | 6 | 56 |
| 5 | 6 | 57 |
| 2 | 4 | 58 |
| 6 | 7 | 59 |
| 10 | 0 | 60 |
| 9 | 6 | 61 |
| 10 | 2 | 62 |
| 10 | 10 | 63 |
| 3 | 4 | 64 |
| 8 | 1 | 65 |
| 0 | 9 | 66 |
| 10 | 7 | 67 |
| 7 | 9 | 68 |
| 2 | 9 | 69 |
| 3 | 6 | 70 |
| 9 | 5 | 71 |
| 4 | 0 | 72 |
| 8 | 9 | 73 |
| 4 | 3 | 74 |
| 4 | 4 | 75 |
| 10 | 6 | 76 |
| 1 | 7 | 77 |
| 0 | 8 | 78 |
| 4 | 5 | 79 |
| 5 | 8 | 80 |
| 3 | 8 | 81 |
| 10 | 9 | 82 |
| 8 | 2 | 83 |
| 6 | 0 | 84 |
| 1 | 8 | 85 |
| 6 | 10 | 86 |
| 6 | 6 | 87 |
| 4 | 9 | 88 |
| 7 | 5 | 89 |
| 0 | 1 | 90 |
| 6 | 2 | 91 |
| 2 | 1 | 92 |
| 10 | 1 | 93 |
| 4 | 8 | 94 |
| 1 | 3 | 95 |
| 9 | 0 | 96 |
| 7 | 1 | 97 |
| 9 | 4 | 98 |
| 9 | 9 | 99 |
| 6 | 8 | 100 |
| 5 | 2 | 101 |
| 0 | 7 | 102 |
| 9 | 3 | 103 |
| 3 | 7 | 104 |
| 4 | 7 | 105 |
| 6 | 1 | 106 |
| 7 | 10 | 107 |
| 8 | 0 | 108 |
| 5 | 7 | 109 |
| 8 | 6 | 110 |
| 8 | 8 | 111 |
| 9 | 1 | 112 |
| 2 | 3 | 113 |
| 0 | 5 | 114 |
| 8 | 10 | 115 |
| 10 | 5 | 116 |
| 6 | 5 | 117 |
| 9 | 7 | 118 |
| 5 | 4 | 119 |
| 1 | 0 | 0 |

FIG. 7 shows an embodiment of a modulo 120 adder. The modulo 120 comprises an adder 551 on seven bits and a table 557. The adder 551 receives the number to be added, for example on seven bits, through two buses 33. The adder 551 has seven result output lines with significance values of 0 to 6 as well as R, with the line R spreading the carry-over. The lines with significance values of 3 to 6 as well as the carry-over are connected to the input of the $2^5 \times 4$ byte table. The results are present on the lines with significance values of 0 to 2, directly coming from the adder 551, and on the lines with significance values 3 to 6, coming from the table 557.

FIG. 8 shows the principle of computation, by tabulation, of a function used in the device according to the invention. Two data buses 321 and 322 form the address bus 33 of a read-only memory 57. The desired function, for example, the addition or subtraction, is tabulated in the memory 57. The result of the operation is emitted by the read-only memory 57 on the data bus 323.

Some examples of tabulated operations, which can be implemented, are given in the tables III to VI.

Table III contains the modulo 8 addition.
Table IV contains the modulo 3 addition.
Table V contains the modulo 7 addition.
Table VI contains the modulo 11 addition.

TABLE III

| + | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 1 | 2 | 3 | 4 | 5 | 6 | 7 | 0 |
| 2 | 2 | 3 | 4 | 5 | 6 | 7 | 0 | 1 |
| 3 | 3 | 4 | 5 | 6 | 7 | 0 | 1 | 2 |
| 4 | 4 | 5 | 6 | 7 | 0 | 1 | 2 | 3 |
| 5 | 5 | 6 | 7 | 0 | 1 | 2 | 3 | 4 |
| 6 | 6 | 7 | 0 | 1 | 2 | 3 | 4 | 5 |
| 7 | 7 | 0 | 1 | 2 | 3 | 4 | 5 | 6 |

TABLE IV

| Modulo $m_1 = 3$ addition | | | |
|---|---|---|---|
| + | 0 | 1 | 2 |
| 0 | 0 | 1 | 2 |
| 1 | 1 | 2 | 0 |
| 2 | 2 | 0 | 1 |

TABLE V

| Modulo $m_2 = 7$ addition | | | | | | | |
|---|---|---|---|---|---|---|---|
| + | 0 | 1 | 2 | 3 | 4 | 5 | 6 |
| 0 | 0 | 1 | 2 | 3 | 4 | 5 | 6 |
| 1 | 1 | 2 | 3 | 4 | 5 | 6 | 0 |
| 2 | 2 | 3 | 4 | 5 | 6 | 0 | 1 |
| 3 | 3 | 4 | 5 | 6 | 0 | 1 | 2 |
| 4 | 4 | 5 | 6 | 0 | 1 | 2 | 3 |
| 5 | 5 | 6 | 0 | 1 | 2 | 3 | 4 |
| 6 | 6 | 0 | 1 | 2 | 3 | 4 | 5 |

TABLE VI

| Addition modulo $M_3 = 11$ | | | | | | | | | | | |
|---|---|---|---|---|---|---|---|---|---|---|---|
| + | 0 | 1 | 2 | 3 | 4 | 5 | 6 | 7 | 8 | 9 | 10 |
| 0 | 0 | 1 | 2 | 3 | 4 | 5 | 6 | 7 | 8 | 9 | 10 |
| 1 | 1 | 2 | 3 | 4 | 5 | 6 | 7 | 8 | 9 | 10 | 0 |
| 2 | 2 | 3 | 4 | 5 | 6 | 7 | 8 | 9 | 10 | 0 | 1 |
| 3 | 3 | 4 | 5 | 6 | 7 | 8 | 9 | 10 | 0 | 1 | 2 |
| 4 | 4 | 5 | 6 | 7 | 8 | 9 | 10 | 0 | 1 | 2 | 3 |
| 5 | 5 | 6 | 7 | 8 | 9 | 10 | 0 | 1 | 2 | 3 | 4 |
| 6 | 6 | 7 | 8 | 9 | 10 | 0 | 1 | 2 | 3 | 4 | 5 |
| 7 | 7 | 8 | 9 | 10 | 0 | 1 | 2 | 3 | 4 | 5 | 6 |
| 8 | 8 | 9 | 10 | 0 | 1 | 2 | 3 | 4 | 5 | 6 | 7 |
| 9 | 9 | 10 | 0 | 1 | 2 | 3 | 4 | 5 | 6 | 7 | 8 |
| 10 | 10 | 0 | 1 | 2 | 3 | 4 | 5 | 6 | 7 | 8 | 9 |

To make the tabulated transcodings, a single data bus 333 is used. The value to be transcoded is present at the bus 33. The desired transcoding value is stored in the read-only memory 57 at the address equal to the value to be transcoded.

Table 7 gives the transcoding values for the first three Galois groups.

TABLE VII

| Whole number | Residue mod $m_1 = 3$ | Residue mod $m_2 = 7$ | Residue mod $m_3 = 11$ |
|---|---|---|---|
| −5 | 1 | 2 | 6 |
| −4 | 2 | 3 | 7 |
| −3 | 0 | 4 | 8 |
| −2 | 1 | 5 | 9 |
| −1 | 2 | 6 | 10 |
| 0 | 0 | 0 | 0 |

TABLE VII-continued

| Whole number | Residue mod $m_1 = 3$ | Residue mod $m_2 = 7$ | Residue mod $m_3 = 11$ |
|---|---|---|---|
| 1 | 1 | 1 | 1 |
| 2 | 2 | 2 | 2 |
| 3 | 0 | 3 | 3 |
| 4 | 1 | 4 | 4 |
| 5 | 2 | 5 | 5 |

The use of the tabulation is, however, restricted by the size of the read-only memories available.

To have numbers in positional notation again, it is possible to formalize what happens in the base changing operation, independently of the manner in which it will be achieved.

Let: ($b_j$) be the orthogonal base of the module R(Q) where $$q = \prod_{i=1}^{k} m_i$$

($b_i$), a non-orthogonal base of the module R(Q) where:

$i = 0, 1, 2, \ldots, n$ with $n = [\log_b q]$ ($q_1$), another non-orthogonal base, that of the combined bases:

$$q_1 = \prod_{j=1}^{l-1} m_j \text{ for } 1 = 2, \ldots, k$$

and $q_1 = 1$.

Any element of R(q) therefore allows a single factorization in these bases.

$$x = \sum_{j=1}^{k} x_j \cdot b_j = \sum_{i=0}^{n} c_i \cdot b^i = \sum_{j=1}^{k} a_1 \cdot q_1$$

The conversion of the coordinates (the change of the base) is done by writing the old base in terms of the new one and then in substituting these expressions in the old factorization.

In a first case, the ($b_i$) base positional notation is transcoded into the ($b_j$) base residual notation:

$$x = \sum_{i=0}^{n} c_i \cdot b^i = \sum_{j=1}^{k} x_i \cdot b_j \text{ with } 0 \leq c_i < b \text{ et } 0 \leq x_j < m_j$$

By the Chinese remainder theorem, we get:

$b_j = M_j \cdot M_j^{-1}$ with $m_j \cdot M_j = q$ et $M_j \cdot M_j^{-1} \equiv 1 \mod m_j$ $b^i = \sum_{j=1}^{k} a_{ij} b_j$ or $0 \leq a_{ij} < m_j$ Then:

$$x = \sum_{i=0}^{n} c_i \cdot b^i$$

$$x = \sum_{i=0}^{n} c_i \left( \sum_{j=1}^{k} a_{ij} \cdot b_j \right)$$

-continued $$x = \sum_{j=1}^{k} \left( \sum_{i=0}^{n} c_i \cdot a_{ij} \right) \cdot b_j$$

$$x = \sum_{j=1}^{k} x_j' \, b_j$$

where:

$$0 \leq x_j' = \sum_{i=0}^{n} c_i \cdot a_{ij} < (n+1) \cdot b \cdot m_j$$

The unique writing of x in base ($g_j$) lays down:

$$0 \leq x_j < m_j$$

And therefore, we write:

$$x_j' = x_j + r_j \cdot m_j \quad x_j' \equiv x_j \bmod m_j$$

Since the transfer of the carry-over value is unnecessary in base ($b_j$), therefore:

$$x_j \equiv \sum_{i=0}^{n} c_i \cdot a_{ij} \bmod m_j$$

If the digits $c_i$ are bits (b=2), then the transcoding of the binary notation into decimal notation amounts to a sequence of additions of terms $a_{ij}$ modulo $m_j$. For ranges which allow it, for example, for n=13, it is advantageous to tabulate the transcoding from the code $c_i$.

It is always possible to do the transcoding by using modulo $m_j$ adders.

In a second case, the base ($b_j$) residual notation is transcoded into base ($q_1$) positional notation with combined bases.

This is the transcoding most used for residual arithmetic and the one which will be used during processing in order to compare intermediate results, for example, because it uses only modulo $m_j$ operators. HERE $$x = \sum_{j=1}^{k} x_j \cdot b_j = \sum_{l=1}^{k} a_1 \cdot q_1 \text{ with } 0 \leq x_j < m_j$$
$$0 \leq a_j < m_j$$

We write:

$$b_j = \sum_{l=1}^{k} \beta_{jl} \, q_1 \text{ where } 0 \leq \beta_{jl} < m_1$$

Then:

$$x = \sum_{i=1}^{k} x_j \cdot \left( \sum_{l=1}^{k} \beta_{jl} \cdot q_1 \right)$$

$$x = \sum_{l=1}^{k} \left( \sum_{i=1}^{k} x_j \cdot \beta_{jl} \right) \cdot q_1$$

$$x = \sum_{l=1}^{k} a_1' \cdot q_1$$

$$0 \leq a_1' = \sum_{i=1}^{k} x_j \cdot \beta_{jl} < k \cdot m_1 \left( \sum_{i=1}^{k} m_i \right)$$

Now, the unicity of the writing in x lays down:

$$0 \leq a_1 < n_1$$

Consequently:

$$a'_1 = a_1 + r_1 \cdot m_1 \quad a'_1 \equiv a_1 \bmod m_1.$$

Only the arithmetic associated with the positional notation requires the transfer of a carry-over value from one digit to the other. The algorithm therefore takes the following form:

$$x = \sum_{l=1}^{k} a_1' \cdot q_1$$

$$x = a'_1 \cdot q_1 + a'_2 \cdot q_2 + \ldots + a'_k \cdot q_k$$

$$x = (a_1 + r_1 \cdot m_1) \cdot q_1 + a'_2 q_2 + \ldots + a'_k q_k$$

Now $m_i q_i = q_{i+1}$ and hence $m_1 = q_2$ $$x = a_1 \cdot q_1 + (r_1 + a'_2) q_2 + \ldots + a'_k q_k$$

$$x = a_1 \cdot q_1 + (a_2 + r_2 \cdot m_2) q_2 + \ldots + a'_k q_k$$

$$x = a_1 \cdot q_1 + a_2 \cdot q_2 + (r_2 + a'_3) q_3 + \ldots + a'_k q_k$$

etc.

$$x = a_1 \cdot q_1 + a_2 \cdot q_2 + a_3 \cdot q_3 + \ldots + a_k q_k + r_k \cdot q$$

and $$x \equiv a_1 q_1 + a_2 q_2 + \ldots + a_k q_k \bmod q$$

The transcoding therefore uses the modular arithmetic (modulo $m_j$) but must preserve the carry-over information to make it go successively to the following digit.

The transcoding algorithm proposed by Szabo can be broken down as follows:

Since $q_1 = 1$, $x_1 = a_1$ (initialization)

$$x = x_1 \cdot b_1 \cdot x_2 \cdot b_2 + \ldots + x_k \cdot b_k$$
$$= a_1 \cdot 1 + a_2 m_1 + a_3 m_1 m_2 + \ldots + a_k m_1 m_2 \ldots m_{k-1}$$

First iteration:

$a_1$ is deducted from the two members of the above equation. But it is known that it is possible to operate on each residual digit independently, modulo $m_j$. $(x_1 - a_1)b_1 + (x_2 - a_1)b_2 + \ldots$
$+ (x_k - a_1)b_k = a_2 m_1 + a_3 m_1 m_2 + \ldots + a_k m_1 m_2 \ldots m_{k-1}$ Now $x_1 - a_1 = 0$.

The right-hand member of the equation can be divided by $m_1$ since each product $a_1.q_1$ contains it, and for the left-hand member, since $m_1$ is relatively prime with $m_j$, $j \neq 1$, the converse of $m_1$ exists modulo $m_j$, $j \neq 1$; let it be written as $m_{1j}^{-1}$, $j \neq 1$.

Then we obtain:

$m_{12}^{-1}(x_2 - a_1)b_2 + m_{13}^{-1}(x_3 - a_1)b_3 + \ldots$
$+ m_{1k}^{-1}(x_k - a_1)b_k = a_2 + a_3 m_2 + \ldots + a_k m_2 m_3 \ldots m_{k-1}$ This equation taken modulo $m_2$, gives:

$$m_{12}^{-1}(x_2-a_1)a_2 \bmod m_2$$

Second iteration:
The same process is started again by deducting a2 on either side of the equation:

$$[m_{13}^{-1}(x_3-a_1)-a_2]b_3+ \ldots$$
$$+[m_{1k}^{-1}(x_k-a_1)-a_2]b_k=a_3m_2+ \ldots +a_km_3 \ldots$$
$$m_{k-1}$$

A division by $m_2$ is done at the right-hand and a multiplication is done at the left-hand by the converse of $m_2$ mod.$m_j$, $j\neq 2$:

$$m_{23}^{-1}[m_{13}^{-1}(x_3-a_1)-a_2]b_3+ \ldots$$
$$+m_{2k}^{-1}[m_{1k}^{-1}(x_k-a_1)-a_2]b_k=a_3+a_4m_3+ \ldots$$
$$+a_km_3 \ldots m_{k-1}$$

The equation modulo $m_3$, gives:

$$m_{23}^{-1}[m_{13}^{-1}(x_3-a_1)-a_2] \equiv a_3 \bmod m_3$$

And so on until $a_k$ is obtained.

The algorithm requires (k−1) iterations, but suffers from a dependence among the residues at each iteration because the digit $a_1$, just found, must be transmitted to the other residues in order to subtract it.

Figure 9:
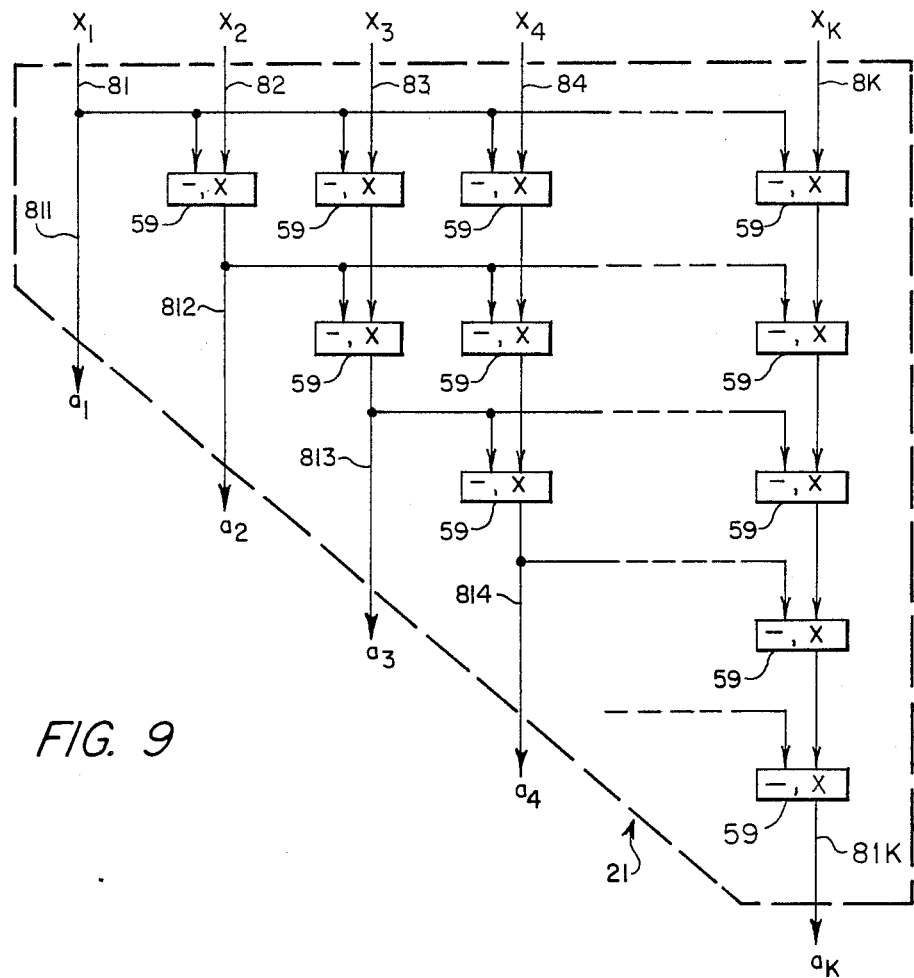
FIG. 9 is a diagram of a detail of an embodiment of the device according to the invention.

FIG. 9 shows an example of an encoding module 21, using Szabo's algorithm. The module 21 has k lines 81 to 8k, capable of giving the digits to be processed. The first line 81 is connected, first, to a line 811 giving a first result $Q_1$ and, second, to first inputs of k−1 subtractors/multipliers 59. The lines 82 to 8k are connected to second inputs of subtractors/multipliers 59.

The output of the multiplier/subtractor connected to the line 82 is connected, first, to a line 812 capable of giving a second result $Q_2$ and, second, to first inputs of k−2 subtractors/multipliers 59.

This interconnection is repeated until a final stage comprising only one subtractor/multiplier 59 is reached, the output of which is connected to a line 81k.

Figure 10:
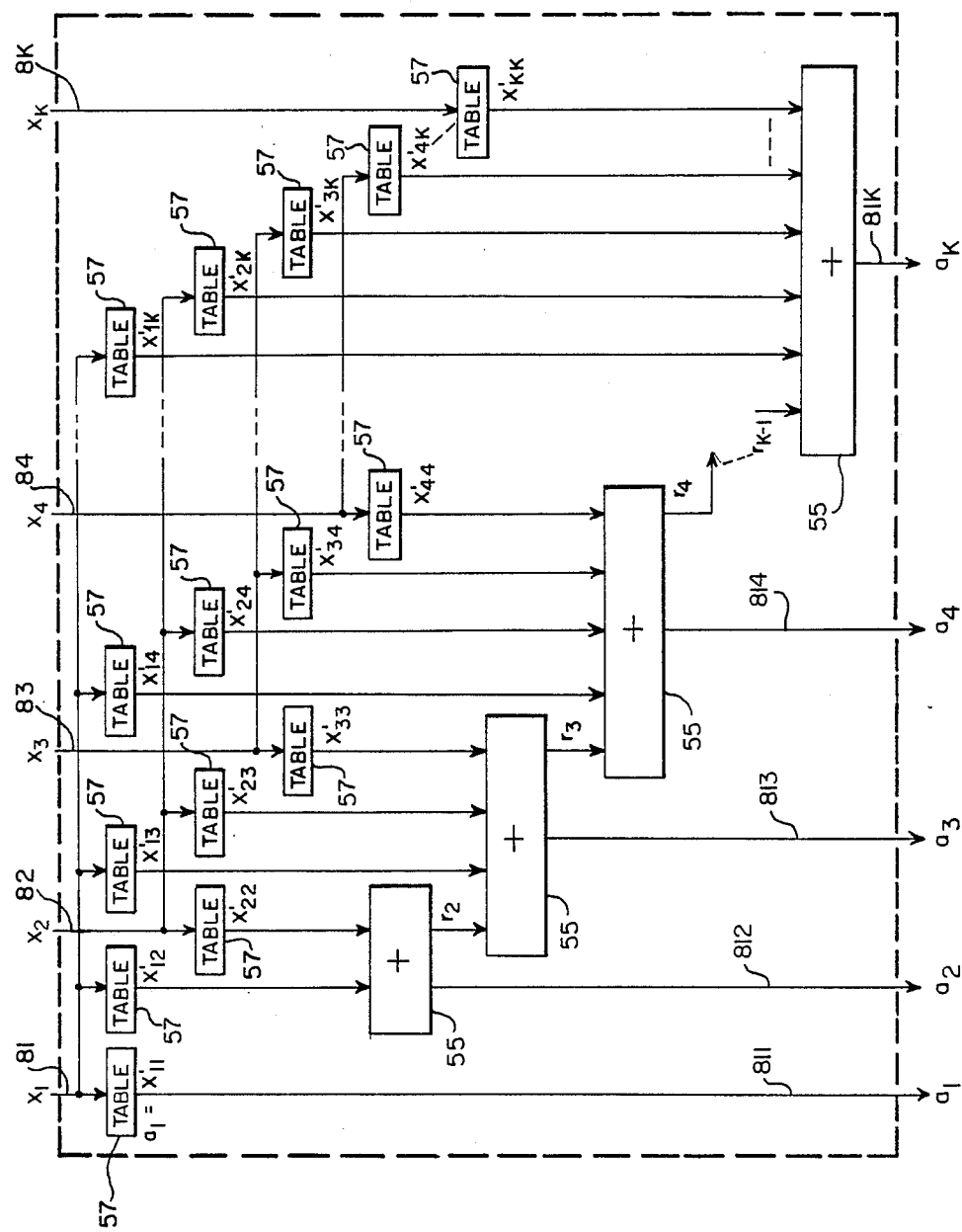
FIG. 10 is a diagram of a detail of an embodiment of the device according to the invention.

FIG. 10 shows a transcoding module 21 or 22 in which the transfer of the carry-over is postponed to the end. Thus, by a parallel architecture, the transcoding module 21 or 22 uses the independence of the results on each digit to reduce the computing time.

We have seen earlier that the conversion comprises two steps:
computation of $a'_1$: with:

$$a_1' = \sum_{i=1}^{k} x_j \cdot \beta_{j1}$$

shaping: $(a'_1) \rightarrow (a_1)$ during which the remainder is transmitted to the following digit.
It is easy to set up the following relationships:

$$a_1' = x_1 \cdot 1$$

$$a_2' = x_1 \cdot \beta_{12} + x_2 \cdot \beta_{22}$$

$$a_3' = x_1 \cdot \beta_{13} + x_2 \cdot \beta_{23} + x_3 \cdot \beta_{33}$$

$$\vdots$$

$$a_k' = x_1 \cdot \beta_{1k} x_2 \cdot \beta_{2k} + x_3 \cdot \beta_{3k} + \ldots + x_k \cdot \beta_{kk}$$

where $0 \leq b_{j1} < m_1$

In view of the complex arithmetic without multiplication performed until now, there is an advantage in not performing the operations indicated. Moreover, the carry-over has to be preserved.

The new method is based on the following observation:
It is possible to memorize the combined base code of:

$$x_j \cdot \left[ \sum_{l=1}^{k} \beta_{jl} \cdot q_l \right]$$

which would be thus addressed by $x_j$. In doing so, the large carry-over value associated with the multiplication is avoided.

$$x_j \cdot \left[ \sum_{l=1}^{k} \beta_{jl} \cdot q_l \right] = \sum_{l=1}^{k} x_{jl}' q_l \text{ with } 0 \leq x_1' < m_1$$

The algorithm is then simplified:

$$a_1' = x_{11}'$$

$$a_2' = x_{12}' + x_{22}'$$

$$a_3' = x_{13}' + x_{23}' + x_{33}'$$

$$\vdots$$

$$a_k' = x_{1k}' + x_{2k}' + x_{3k}' + \ldots + x_{kk}'$$

The task that remains is that of performing additions with carry-over and to transmit the carry-over to the following digit. Now, it is clear that the carry-over information of the term $a_1$, to be transmitted, is available before the end of the computation of the term $a'_{1+1}$, and that this carry-over value is small.

The transcoding module 21 or 22 has k input lines 81 to 8k capable of spreading the digits $x_1$ to $x_k$ to be transcoded. The input line is connected to k read-only memories 57. The input line 82 is connected to k−1 read-only memories 57. The input line 83 is connected to k−2 read-only memories 57. The number of read-only memories decreases by one unit at each new input line. The input line 8k is connected to a single read-only memory 57.

The first read-only memory 57, connected to the input line 81, is connected to the output line 811 capable of giving a transcoded digit $a_1$.

The second read-only memory 57, connected to the input line 81, is connected to a first input of an adder 55, performing the modulo $m_2$ addition with carry-over.

The third read-only memory 57, connected to the input line 81, is connected to one of the four inputs of an adder 55 performing the modulo $m_3$ addition with carry-over.

The fourth read-only memory 57, connected to the input line 81, is connected to one of the five inputs of an adder 55 performing the modulo $m_4$ addition with carry-over.

This is continued until the $k^{th}$ read-only memory 57, connected to the input line 81 and connected to one of the k−1 inputs of an adder 55 performing the modulo $m_k$ addition.

The carry-over of the modulo $m_2$ adder 55 is connected to one of the inputs of the modulo $m_3$ adder 55.

The carry-over of the modulo $m_3$ adder 55 is connected to one of the inputs of the modulo $m_4$ adder 55.

This continues until the carry-over of the modulo $m_{k-1}$ adder 55, which is connected to one of the inputs of the modulo $m_k$ adder 55.

A first read-only memory 57 connected to the input line 82 is connected to an input of the modulo $m_2$ adder 55.

A second read-only memory 57 connected to the input line 82 is connected to one of the inputs of the modulo $m_3$ adder 55.

This is continued until the $k^{th}$ read-only memory 57, connected to the input line 82, is connected to one of the inputs of the modulo $m_k$ adder 55.

The read-only memories 57, connected to the $i^{th}$ input line (8$i$) are connected to the adder 55, performing the modulo $m_i$ addition up to the adder 55 performing the modulo $m_k$ addition.

The output lines 812 to 81$k$ are respectively connected to the outputs of the modulo $m_2$ to modulo $m_k$ adders 55.

In FIG. 10, the input values are marked $x_i$, from $x_1$ to $x_k$; the values obtained from a read-only memory are marked $x'_{ij}$, from $x'_{11}$ to $x'_{kk}$, the carry-over values are marked $r_i$ from $r_2$ to $r_{k-1}$; the results are marked $a_i$, from $a_1$ to $a_k$.

The modulo $m_i$ adders are, for example, made by tabulation.

Figure 11:
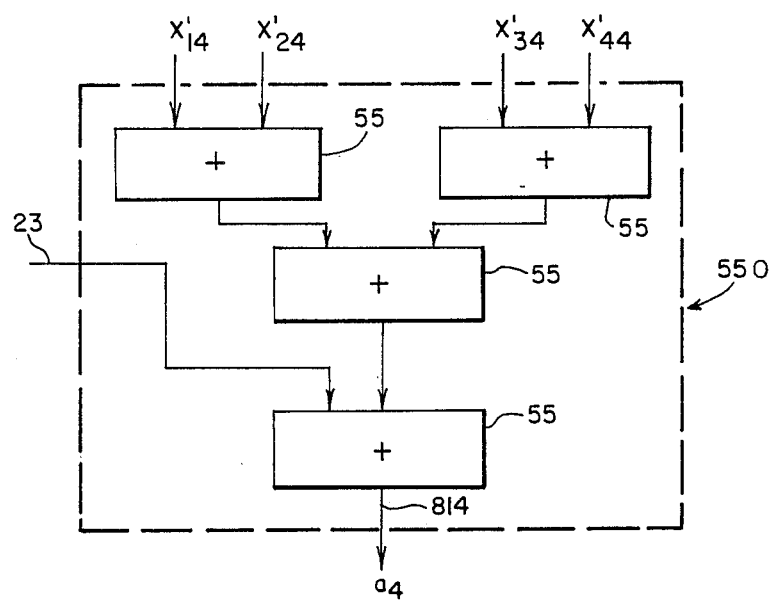
FIG. 11 is a diagram of a detail of an embodiment of the device according to the invention.

Advantageously, for the transcoding, use is made of arborescent structured adders 55 in which the carry-over of the previous branch is added to the last stage of said adders. An example of a modulo $m_4$ adder with an arborescent structure is shown in FIG. 11. FIG. 11 uses the same notation as FIG. 10.

The modulo $m_4$ adder 550 of FIG. 11 has four elementary adders which are also marked 55.

Each elementary adder 55 receives two digits to be added and gives a result. The first two elementary adders 55 respectively receive $x'_{14}$, $x'_{24}$ and $x'_{34}$, $x'_{44}$. The third elementary adder 55 adds up the results of the first two elementary adders 55. The fourth elementary adder 55 adds the remainder $r_3$ of the previous branch to the results obtained by the third elementary adder 55. The result $a_4$ of the summation performed by the fourth elementary adder 55 is emitted on a line 814.

The total conversion time is reduced to the summation time $a_k$, namely $(1+[\log 2(k=1)])$ times the elementary addition period, where [x] signifies the whole number immediately greater than x.

The throughput rate is then determined by the converse of the longest period, between the period of a memory reading and the conversion period.

This method is, as can be seen, considerably faster than the classical Szabo method.

Transcoding: positional notation ($q_1$) into base ($b_1$) positional notation.

This conversion concerns only the final result to return, if desired, to standard positional notation:

$$x = \sum_{l=1}^{k} a_1 \cdot q_1 = \sum_{i=0}^{m} c_i \cdot b^i$$

$$x = \sum_{i=0}^{n} \left( \sum_{l=1}^{k} a_1 \cdot \gamma_{1i} \right) \cdot b^i$$

$$0 \leq \gamma_{1i} b$$

The conversion also implies the manipulation of a carry-over value but if the task is done in binary notation (which is what should happen most usually) $\tau_{1i}$ assumes the values 0 or 1, and the conversion requires only adders, of a maximum number of k per branch, with a maximum bits field of the order of log 2 q. Recomposition of $Z=AX+BY$ in $R(q^2)$. The transcoding into base ($q_1$) is given by table VIII.

TABLE VIII

| Code with combined bases of residues | | | | | |
|---|---|---|---|---|---|
| x1 | x2 | x3 | a1 | a2 | a3 |
| b1 = 154 | b2 = 99 | b3 = 210 | q1 = 1 | q2 = 3 | q3 = 21 |
| 0 | 0 | 0 | 0 | 0 | 0 |
| 1 | 0 | 0 | 1 | 2 | 7 |
| 2 | 0 | 0 | 2 | 4 | 3 |
| 0 | 1 | 0 | 0 | 5 | 4 |
| 0 | 2 | 0 | 0 | 3 | 9 |
| 0 | 3 | 0 | 0 | 1 | 3 |
| 0 | 4 | 0 | 0 | 6 | 7 |
| 0 | 5 | 0 | 0 | 4 | 1 |
| 0 | 6 | 0 | 0 | 2 | 6 |
| 0 | 0 | 1 | 0 | 0 | 10 |
| 0 | 0 | 2 | 0 | 0 | 9 |
| 0 | 0 | 3 | 0 | 0 | 8 |
| 0 | 0 | 4 | 0 | 0 | 7 |
| 0 | 0 | 5 | 0 | 0 | 6 |
| 0 | 0 | 6 | 0 | 0 | 5 |
| 0 | 0 | 7 | 0 | 0 | 4 |
| 0 | 0 | 8 | 0 | 0 | 3 |
| 0 | 0 | 9 | 0 | 0 | 2 |
| 0 | 0 | 10 | 0 | 0 | 1 |

The device according to the present invention is used to perform very fast digital computations. Depending on the type of computation needed, the device according to the invention will form a coprocessor of a standard computer, a computer comprising a front computer (not shown) or an entirely independent computer.

Thus, the device according to the invention can be made in various forms depending on the computing power desired and the technology used.

In a first embodiment, the device according to the invention has several electronic cards.

In a second embodiment, the device according to the invention is made in the form of a printed circuit.

In a third embodiment, the device according to the invention is made in the form of a printed circuit, for example, a circuit with very large scale integration (VLSI).

The invention advantageously has one or more fast circuits made of gallium arsenide.

The invention can be applied especially to digital computation.

The invention can be applied chiefly to the processing of signals and to digital filtering.

What is claimed is:

1. A computation device comprising:
   a numeral encoding module converting numbers from positional notation into residual notation on a ring so that a complex multiplication corresponds to an index addition;
   a computation module connected to the output of the number encoding module performing complex computations in residual notation using residual computed modulo the numbers $m_i$ of the form $m^i=4k+3$, where k is a whole number, said module including means used to associate, with each complex number, an index, such that a multiplication of two complex numbers corresponds bi-uniquely to an addition of said complex number indices; and, a decoding module connected to the output of the computing module, converting numbers from residual notation into positional notation.

2. A computing device according to claim 1, comprising buses capable of connecting the computation module to internal or external memories containing numbers written in residual notation.

3. A computing device according to claim 2, wherein the computation module is connected by a bus to a read-only memory.

4. A computing device according to claim 1, wherein said device is capable of performing convolutions.

5. A computing device according to claim 1, capable of performing correlations.

6. A computing device according to claim 1, comprising read-only memories in which tabulated functions are stored.

7. A device according to claim 1, wherein the encoding and decoding modules comprise data paths used to perform the addition of carried-over values computed for each digit during encoding and decoding operations.

* * * * *